US012282735B1

(12) United States Patent
Antebi et al.

(10) Patent No.: US 12,282,735 B1
(45) Date of Patent: *Apr. 22, 2025

(54) DISTRIBUTED DOCUMENT CO-AUTHORING AND PROCESSING

(71) Applicant: Jive Software, Inc., Austin, TX (US)

(72) Inventors: Oudi Antebi, Los Altos Hills, CA (US); Roy Antebi, Tel Aviv (IL); Reem Bensimhon, Tel Aviv (IL); Lev Waisberg, Tel Aviv (IL)

(73) Assignee: Jive Software, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/224,945

(22) Filed: Apr. 7, 2021

Related U.S. Application Data

(60) Continuation of application No. 14/280,050, filed on May 16, 2014, now Pat. No. 11,068,648, which is a division of application No. 13/011,683, filed on Jan. 21, 2011, now Pat. No. 9,367,530.

(51) Int. Cl.
*G06F 40/197* (2020.01)
*G06F 16/182* (2019.01)
*G06F 40/169* (2020.01)

(52) U.S. Cl.
CPC ........ *G06F 40/197* (2020.01); *G06F 16/1834* (2019.01); *G06F 40/169* (2020.01)

(58) Field of Classification Search
CPC ... G06F 40/197; G06F 16/1834; G06F 40/169
USPC ........................................................ 715/229
See application file for complete search history.

(56) References Cited

U.S. PATENT DOCUMENTS

| 2008/0028300 | A1* | 1/2008 | Krieger | G06Q 10/10 |
| | | | | 715/255 |
| 2009/0125518 | A1* | 5/2009 | Bailor | G06Q 10/10 |
| 2014/0282013 | A1* | 9/2014 | Amijee | G06F 3/0482 |
| | | | | 715/732 |

OTHER PUBLICATIONS

Notice of Allowance mailed May 2, 2016, filed in U.S. Appl. No. 13/011,683, pp. 1-9.
Examiner Initiated Interview Summary dated May 2, 2016, filed in U.S. Appl. No. 13/011,683, p. 1.
Response to Final Office Action Initiated by Examiner dated May 2, 2016, filed in U.S. Appl. No. 13/011,683, p. 1.
Response to Final Office Action dated Feb. 10, 2016, filed in U.S. Appl. No. 13/011,683, pp. 1-12.

(Continued)

*Primary Examiner* — Toan H Vu

(57) ABSTRACT

A method and a device are disclosed including plug-in software components that are integrated with document processing software suites. The plug-in software components provide a set of integrated interfaces for collaborative document processing in conjunction with multiple remote file, data, and application service providers. The set of interfaces enable coauthoring a document, document merging, discovering and displaying context-sensitive metadata on a software dashboard based on permissions associated with the metadata and/or a client computing device, caching, symmetric distributed document merge with the multiple service providers, and integrated search and insertion of multimedia data in documents, among others. The documents typically include, but are not limited to formatted text documents, spreadsheet documents, and slide presentation documents.

14 Claims, 15 Drawing Sheets

(56) References Cited

OTHER PUBLICATIONS

Non-Final Office Action mailed Aug. 13, 2015, filed in U.S. Appl. No. 13/011,683, pp. 1-14.
Request for Continued Examination dated Jul. 16, 2015, filed in U.S. Appl. No. 13/011,683, pp. 1-3.
Advisory Action mailed May 12, 2015, filed in U.S. Appl. No. 13/011,683, pp. 1-3.
Response to Final Office Action initialed by Examiner May 12, 2015, filed in U.S. Appl. No. 13/011,683, p. 1.
Response to Final Office Action dated May 4, 2015, filed in U.S. Appl. No. 13/011,683, pp. 1-7.
Final Office Action mailed Mar. 2, 2015, filed in U.S. Appl. No. 13/011,683, pp. 1-14.
Amendment and Response to Non-Final Office Action dated Jan. 20, 2015, filed in U.S. Appl. No. 13/011,683, pp. 1-11.
Non-Final Office Action mailed Jul. 24, 2014, filed in U.S. Appl. No. 13/011,683, pp. 1-12.
Request for Continued Examination dated Jun. 13, 2014, filed in U.S. Appl. No. 13/011,683, pp. 1-3.
Advisory Action mailed Jun. 6, 2014, filed in U.S. Appl. No. 13/011,683, pp. 1-4.
Amendment and Response to Final Office Action dated May 28, 2014, filed in U.S. Appl. No. 13/011,683, pp. 1-10.
Final Office Action mailed Mar. 28, 2014, filed in U.S. Appl. No. 13/011,683, pp. 1-12.
Amendment and Response to Non-Final Office Action dated Dec. 18, 2013, filed in U.S. Appl. No. 13/011,683, pp. 1-11.
Non-Final Office Action mailed Sep. 17, 2013, filed in U.S. Appl. No. 13/011,683, pp. 1-13.
Request for Continued Examination dated May 22, 2013, filed in U.S. Appl. No. 13/011,683, pp. 1-3.
Advisory Action mailed Apr. 10, 2013, filed in U.S. Appl. No. 13/011,683, pp. 1-4.
Amendment and Response to Final Office Action dated Mar. 25, 2013, filed in U.S. Appl. No. 13/011,683, pp. 1-14.
Non-Final Office Action mailed Jan. 25, 2013, filed in U.S. Appl. No. 13/011,683, pp. 1-13.
Amendment and Response to Final Office Action dated Nov. 23, 2012, filed in U.S. Appl. No. 13/011,683, pp. 1-13.
Non-Final Office Action mailed Aug. 22, 2012, filed in U.S. Appl. No. 13/011,683, pp. 1-12.
Amendment and Response to Non-Final Office Action dated Jul. 2, 2012, filed in U.S. Appl. No. 13/011,683, pp. 1-4.
Non-Final Office Action mailed Jun. 1, 2012, filed in U.S. Appl. No. 13/011,683, pp. 1-7.
Notice of Allowance mailed Mar. 15, 2021, filed in U.S. Appl. No. 14/280,050, pp. 1-9.
Request for Continued Examination dated Nov. 4, 2020, filed in U.S. Appl. No. 14/280,050, pp. 1-13.
Final Office Action mailed May 4, 2020, filed in U.S. Appl. No. 14/280,050, pp. 1-23.
Response to Final Office Action dated Mar. 16, 2020, filed in U.S. Appl. No. 14/280,050, pp. 1-11.
Non-Final Office Action mailed Sep. 16, 2019, filed in U.S. Appl. No. 14/280,050, pp. 1-19.
Request for Continued Examination dated Dec. 17, 2018, filed in U.S. Appl. No. 14/280,050, pp. 1-16.
Advisory Action mailed Nov. 26, 2018, filed in U.S. Appl. No. 14/280,050, pp. 1-3.
After Final Consideration Program Decision dated Nov. 26, 2018, filed in U.S. Appl. No. 14/280,050, pp. 1-17.
Response to Non-Final Office Action dated Nov. 15, 2018, filed in U.S. Appl. No. 14/280,050, pp. 1-14.
Petition Decision dated Sep. 20, 2018, filed in U.S. Appl. No. 14/280,050, p. 1.
Petition for Review dated Jul. 16, 2018, filed in U.S. Appl. No. 14/280,050, pp. 1-4.
Final Office Action mailed Jun. 15, 2018, filed in U.S. Appl. No. 14/280,050, pp. 1-18.
Response to Non-Final Office Action dated Mar. 21, 2018, filed in U.S. Appl. No. 14/280,050, pp. 1-9.
Non-Final Office Action mailed Sep. 21, 2017, filed in U.S. Appl. No. 14/280,050, pp. 1-20.
Petition Decision dated Apr. 16, 2017, filed in U.S. Appl. No. 14/280,050, pp. 1-3.
Petition for Review dated May 5, 2017, filed in U.S. Appl. No. 14/280,050, pp. 1-3.
Request for Continued Examination dated Mar. 3, 2017, filed in U.S. Appl. No. 14/280,050, pp. 1-3.
Advisory Action mailed Dec. 14, 2016, filed in U.S. Appl. No. 14/280,050, pp. 1-3.
Response to Final Office Action dated Dec. 14, 2016, filed in U.S. Appl. No. 14/280,050, p. 1.
Response to Final Office Action dated Nov. 14, 2016, filed in U.S. Appl. No. 14/280,050, pp. 1-6.
Final Office Action mailed Jun. 9, 2016, filed in U.S. Appl. No. 14/280,050, pp. 1-17.
Response to Final Office Action dated Mar. 23, 2016, filed in U.S. Appl. No. 14/280,050, pp. 1-9.
Non-Final Office Action mailed Dec. 22, 2015, filed in U.S. Appl. No. 14/280,050, pp. 1-17.

* cited by examiner

DISTRIBUTED DOCUMENT CO-AUTHORING AND PROCESSING

TECHNICAL FIELD

This application relates generally to document processing. More specifically, this application relates to distributed co-authoring and processing of a particular document via multiple third party collaboration service providers and collecting and displaying metadata related to the particular document.

SUMMARY

In aspects of the present disclosures, a method of co-authoring a document is disclosed including detecting a first set of changes made to a first version of a particular document on a first client computing device, detecting a second set of changes made to a second version of the particular document on a second client computing device, and communicating the first set of changes and the second set of changes to the second client computing device and the first client computing device, respectively, via a third party collaboration service provider unassociated with a document processing suite used to edit the particular document.

In further aspects of the present disclosures, a software plug-in component is disclosed, configured to be integrated with a document processing suite, that when executed on a first client computing device causes the first client computing device to present an integrated user interface within the document processing suite, the integrated user interface configured to communicate with a third party collaboration service provider not associated with the document processing suite.

In still further aspects of the disclosure, a method of co-authoring a document is disclosed including dynamically discovering metadata related to a particular document being edited using a document processing suite, and displaying the discovered metadata in a dashboard area of a client computing device executing the document processing suite.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
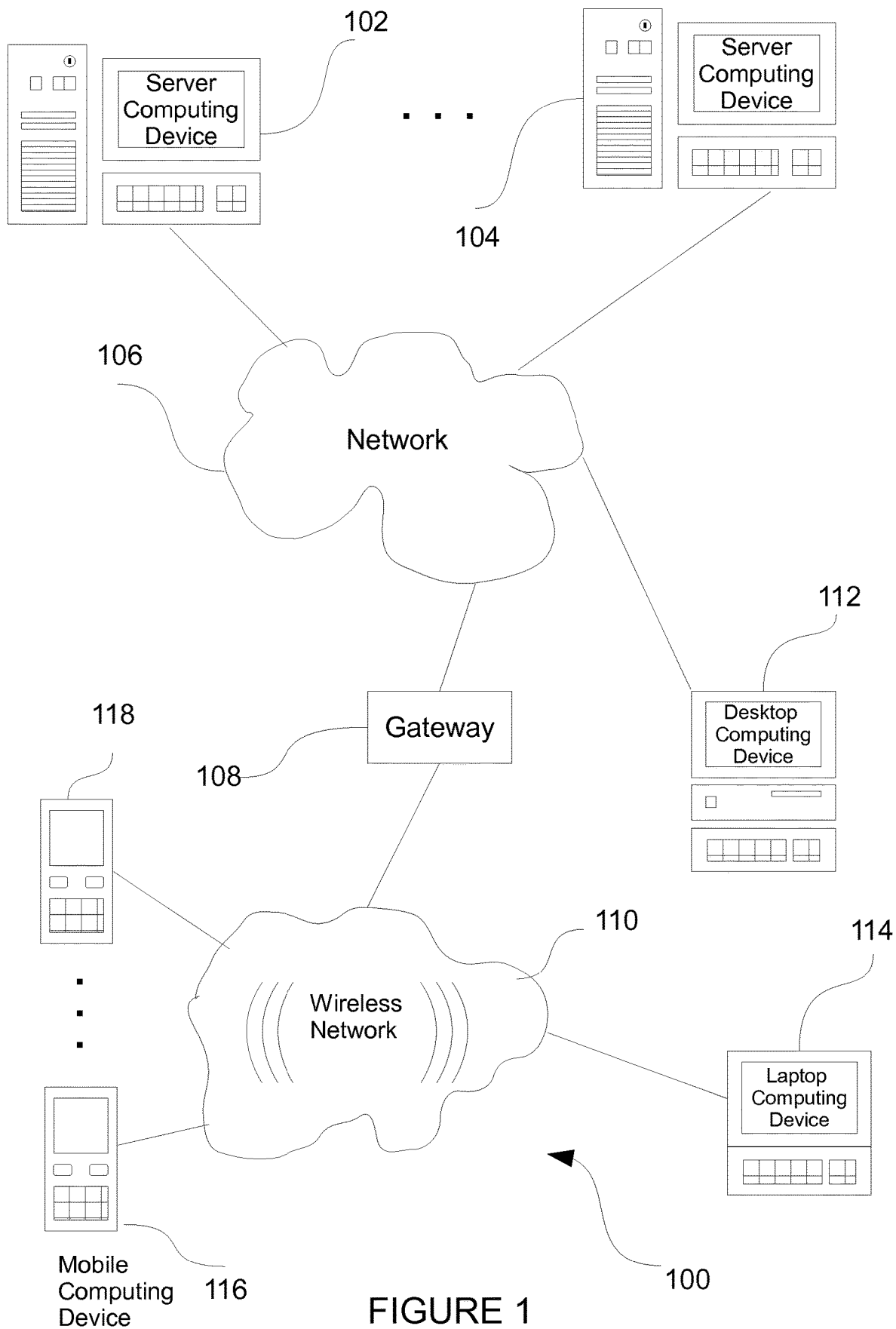
FIG. 1 shows an embodiment of a network computing environment wherein the disclosure may be practiced.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while following description references particular office software suites like Microsoft Office® it will be appreciated that the disclosure may be used with other types of document processing suites, such as Open Office®, Corel® and the like.

Briefly described, a device and a method are disclosed including plug-in software components that are integrated with document processing software suites. The plug-in software components provide a set of integrated interfaces for collaborative document processing in conjunction with multiple remote file, data, and third party application service providers. The set of interfaces enable coauthoring a document, document merging, discovering and displaying context-sensitive metadata on a software dashboard based on permissions associated with the metadata and/or a client computing device, caching, symmetric document merge with the multiple service providers, and integrated search and insertion of multimedia data in documents, among others. The documents typically include, but are not limited to formatted text documents, spreadsheet documents, and slide presentation documents. At least two broad sets of features are provided by the present disclosure: one, functionality additional to what is traditionally associated with various document processing software suites such as co-authoring, image-based search, and offline access to remote files, and two, integration with third party collaboration servers that live in the cloud or on a LAN environment using file-related metadata, and integrated comment processing.

Cloud computing refers to software applications and data that are accessed remotely via the web in contrast to applications residing and accessed locally on a user's computer. Some cloud computing solutions enable users to share and work together on documents while others let users store content and files on a location that is accessible from any computer. The integrated interfaces disclosed herein substantially bring cloud computing functionality into the users' local computer, allowing the user to use office products' features while also seamlessly incorporating new web functionality.

A number of companies produce document processing software products that typically include a word processing program, a spreadsheet program, a presentation program, and an email and calendaring program, such as Microsoft Office® (Word, PowerPoint, Excel and Outlook), Corel (Word Perfect Suite), Oracle Open Office®, and others. Throughout this disclosure the terms Office products, Office, document processing suites, and the like include, but are not limited to word processing programs such as Microsoft Word®, spreadsheet programs such as Microsoft Excel®, electronic mailing (e-mail) and calendaring programs such as Outlook®, and slide presentation programs such as Microsoft Power Point®. Historically these programs ran and worked locally on the user's computer, using only that which was available on the local system, and storing resultant work products on the local system. More recently, new features have been added to some of these document processing products that allow a user to have limited interaction with the world wide web (web), for example, to use online (network accessible) storage, search, and similar limited features from within the respective products.

File, data, and third party application service providers use servers, such as Microsoft's SharePoint® server, to serve clients by providing storage for data and functionalities that allow different clients to collaborate and share data and information, for example, during the course of a project. Application service providers may include third party collaboration servers/services unassociated with the document processing suites used to edit documents. For example, some document processing suites, such as Microsoft Office, are designed to work with collaboration servers, such as SharePoint, but not with other collaboration servers, and vice versa.

Various technologies, languages, and protocols are used to provide such remote services to clients. For example, ASP (Active Service Pages), web parts (related to ASP), SOAP (Simple Object Access Protocol), XML (eXtensible Markup Language), JavaScript, C#, and other technologies further described below may be used to interact with the web. SharePoint Web Parts are UI elements that support both customization and personalization. A Web Part is an ASP-.NET server control designed to be edited and modified by knowledge workers. A Web Part works as a component of a SharePoint site that presents information pulled from multiple data sources. With Web Parts, information dashboards can be created on corporate portals and Web sites. Web Part pages allow personalization of information relevant to a user's needs by updating the value of specific Web Part properties.

With the ubiquity of users' internet access there is an ever increasing demand for expanded services, functionality, online storage, sharing capabilities, and the like. For example, some toolbars are available that is integrated with Microsoft Office® and allows the user to store documents online. However, these toolbars and the online storage they provide are limited in applicability, forces the user to use Microsoft® Office products, and does not provide the user with a full range of document processing tools that may be available from different and/or competing service providers, such as real-time display of context-based meta data, collaborative authoring, full document merge capabilities, and the like.

Illustrative Operating Environment

FIG. 1 shows components of an illustrative environment in which the disclosure may be practiced. Not all the shown components may be required to practice the disclosure, and variations in the arrangement and type of the components may be made without departing from the spirit or scope of the disclosure. System 100 may include Local Area Networks (LAN) and Wide Area Networks (WAN) shown collectively as Network 106, wireless network 110, gateway 108 configured to connect remote and/or different types of networks together, client computing devices 112-118, and server computing devices 102-104.

One embodiment of a computing device usable as one of client computing devices 112-118 is described in more detail below with respect to FIG. 2. Briefly, however, client computing devices 112-118 may include virtually any device capable of receiving and sending a message over a network, such as wireless network 110, or the like. Such devices include portable devices such as, cellular telephones, smart phones, display pagers, radio frequency (RF) devices, music players, digital cameras, infrared (IR) devices, Personal Digital Assistants (PDAs), handheld computers, laptop computers, wearable computers, tablet computers, integrated devices combining one or more of the preceding devices, or the like. Client device 112 may include virtually any computing device that typically connects using a wired communications medium such as personal computers, multiprocessor systems, microprocessor-based or programmable consumer electronics, network PCs, or the like. In one embodiment, one or more of client devices 112-118 may also be configured to operate over a wired and/or a wireless network.

Client devices 112-118 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphic may be displayed.

A web-enabled client device may include a browser application that is configured to receive and to send web pages, web-based messages, or the like. The browser application may be configured to receive and display graphic, text, multimedia, or the like, employing virtually any web based language, including a wireless application protocol messages (WAP), or the like. In one embodiment, the browser application may be enabled to employ one or more of Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information. Client computing devices 12-118 also may include at least one other client application that is configured to receive content from another computing device, including, without limit, server computing devices 102-104. The client application may include a capability to provide and receive textual content, multimedia information, or the like. The client application may further provide information that identifies itself, including a type, capability, name, or the like. In one embodiment, client devices 112-118 may uniquely identify themselves through any of a variety of mechanisms, including a phone number, Mobile Identification Number (MIN), an electronic serial number (ESN), mobile device identifier, network address, such as IP (Internet Protocol) address, Media Access Control (MAC) layer identifier, or other identifier. The identifier may be provided in a message, or the like, sent to another computing device.

Client computing devices 112-118 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, to another computing device. However, the present disclosure is not limited to these message protocols, and virtually any other message protocol may be employed.

Client devices 112-118 may further be configured to include a client application that enables the user to log into a user account that may be managed by another computing device. Such user account, for example, may be configured to enable the user to receive emails, send/receive IM messages, SMS messages, access selected web pages, download scripts, applications, or a variety of other content, or perform a variety of other actions over a network. However, managing of messages or otherwise accessing and/or downloading content, may also be performed without logging into the user account. Thus, a user of client devices 112-118 may employ any of a variety of client applications to access content, read web pages, receive/send messages, or the like. In one embodiment, for example, the user may employ a browser or other client application to access a web page hosted by a Web server implemented as server computing device 102. In one embodiment, messages received by client computing devices 112-118 may be saved in non-volatile memory, such as flash and/or PCM, across communication sessions and/or between power cycles of client computing devices 112-118.

Wireless network 110 may be configured to couple client devices 114-118 to network 106. Wireless network 110 may include any of a variety of wireless sub-networks that may further overlay stand-alone ad-hoc networks, and the like, to provide an infrastructure-oriented connection for client devices 114-118. Such sub-networks may include mesh networks, Wireless LAN (WLAN) networks, cellular networks, and the like. Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 114-118 with various degrees of mobility. For example, wireless network 110 may enable a radio connection through a radio network access such as Global System for Mobil communication (GSM), General Packet Radio Services (GPRS), Enhanced Data GSM Environment (EDGE), WEDGE, Bluetooth, High Speed Downlink Packet Access (HSDPA), Universal Mobile Telecommunications System (UMTS), Wi-Fi, Zigbee, Wideband Code Division Multiple Access (WCDMA), and the like. In essence, wireless network 110 may include virtually any wireless communication mechanism by which information may travel between client devices 102-104 and another computing device, network, and the like.

Network 106 is configured to couple one or more servers depicted in FIG. 1 as server computing devices 102-104 and their respective components with other computing devices, such as client device 112, and through wireless network 110 to client devices 114-118. Network 106 is enabled to employ any form of computer readable media for communicating information from one electronic device to another. Also, network 106 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

Communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 106 may include any communication method by which information may travel between computing devices. Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

Figure 2:
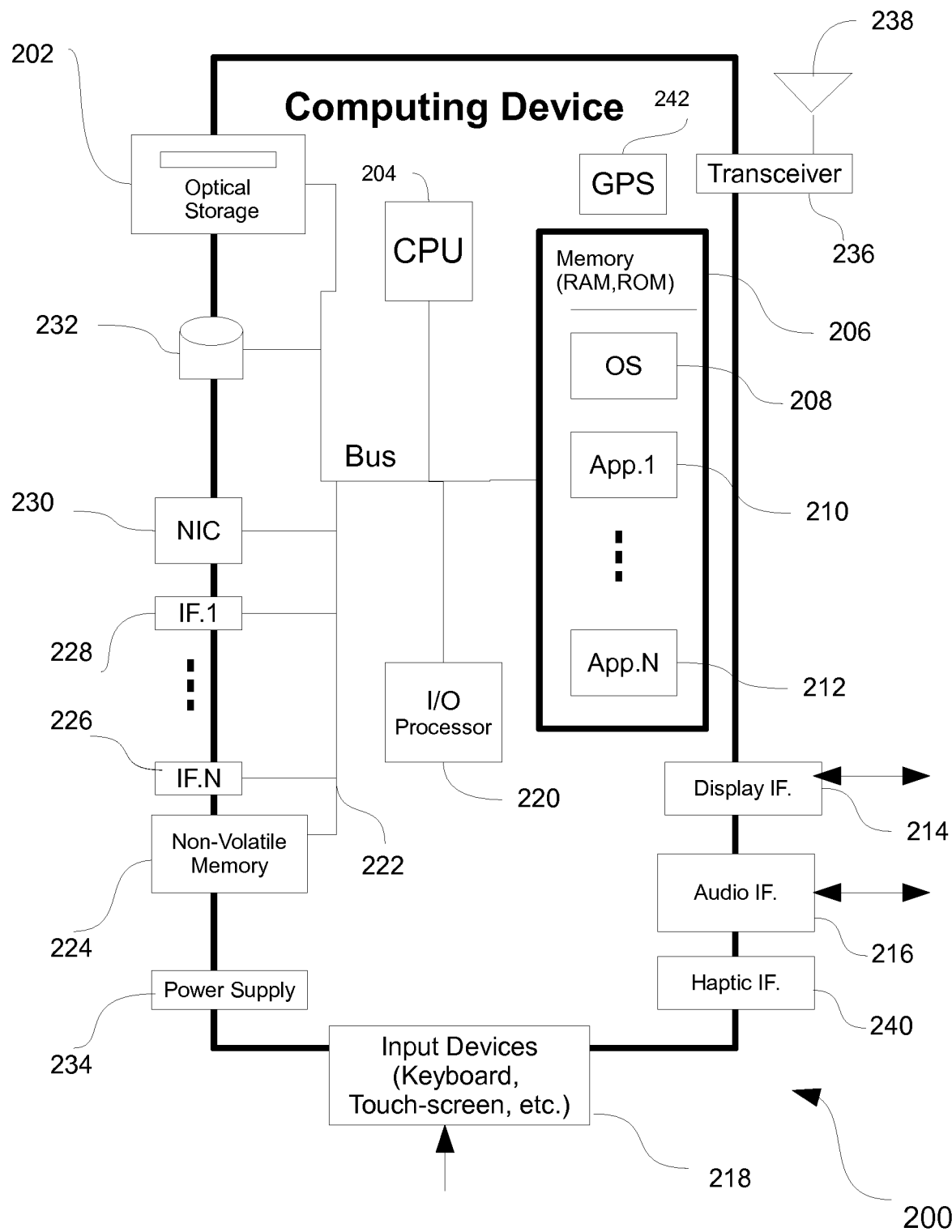
FIG. 2 shows an embodiment of a computing device that may be used in the network computing environment of FIG. 1.

Illustrative Computing Device Configuration FIG. 2 shows an illustrative computing device 200 that may represent any one of the server and/or client computing devices shown in FIG. 1. A computing device represented by computing device 200 may include less or more than all the components shown in FIG. 2 depending on the functionality needed. For example, a mobile computing device may include the transceiver 236 and antenna 238, while a server computing device 102 of FIG. 1 may not include these components. Those skilled in the art will appreciate that the scope of integration of components of computing device 200 may be different from what is shown. As such, some of the components of computing device 200 shown in FIG. 2 may be integrated together as one unit. For example, NIC 230 and transceiver 236 may be implemented as an integrated unit. Additionally, different functions of a single component may be separated and implemented across several components instead. For example, different functions of I/O processor 220 may be separated into two or more processing units.

With continued reference to FIG. 2, computing device 200 includes optical storage 202, Central Processing Unit (CPU) 204, memory module 206, display interface 214, audio interface 216, input devices 218, Input/Output (I/O) processor 220, bus 222, non-volatile memory 224, various other interfaces 226-228, Network Interface Card (NIC) 320, hard disk 232, power supply 234, transceiver 236, antenna 238, haptic interface 240, and Global Positioning System (GPS) unit 242. Memory module 206 may include software such as Operating System (OS) 208, and a variety of software application programs 210-212. Computing device 200 may also include other components not shown in FIG. 2. For example, computing device 200 may further include an illuminator (for example, a light), graphic interface, and portable storage media such as USB drives. Computing device 200 may also include other processing units, such as a math co-processor, graphics processor/accelerator, and a Digital Signal Processor (DSP).

Optical storage device 202 may include optical drives for using optical media, such as CD (Compact Disc), DVD (Digital Video Disc), and the like. Optical storage devices 202 may provide inexpensive ways for storing information for archival and/or distribution purposes.

Central Processing Unit (CPU) 204 may be the main processor for software program execution in computing device 200. CPU 204 may represent one or more processing units that obtain software instructions from memory module 206 and execute such instructions to carry out computations and/or transfer data between various sources and destinations of data, such as hard disk 232, I/O processor 220, display interface 214, input devices 218, non-volatile memory 224, and the like.

Memory module 206 may include RAM (Random Access Memory), ROM (Read Only Memory), and other storage means, mapped to one addressable memory space. Memory module 206 illustrates one of many types of computer storage media for storage of information such as computer readable instructions, data structures, program modules or other data. Memory module 206 may store a basic input/output system (BIOS) for controlling low-level operation of computing device 200. Memory module 206 may also store OS 208 for controlling the general operation of computing device 200. It will be appreciated that OS 208 may include a general-purpose operating system such as a version of UNIX, or LINUX™, or a specialized client communication operating system such as Windows Mobile™, or the Symbian® operating system. OS 208 may, in turn, include or interface with a Java virtual machine (JVM) module that enables control of hardware components and/or operating system operations via Java application programs.

Memory module 206 may further include one or more distinct areas (by address space and/or other means), which can be utilized by computing device 200 to store, among other things, applications and/or other data. For example, one area of memory module 206 may be set aside and employed to store information that describes various capabilities of computing device 200, a device identifier, and the like. Such identification information may then be provided to another device based on any of a variety of events, including being sent as part of a header during a communication, sent upon request, or the like. One common software application is a browser program that is generally used to send/receive information to/from a web server. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed. In one embodiment, using the browser application, a user may view an article or other content on a web page with one or more highlighted portions as target objects.

Display interface 214 may be coupled with a display unit (not shown), such as liquid crystal display (LCD), gas plasma, light emitting diode (LED), or any other type of display unit that may be used with computing device 200. Display units coupled with display interface 214 may also include a touch sensitive screen arranged to receive input from an object such as a stylus or a digit from a human hand. Display interface 214 may further include interface for other visual status indicators, such Light Emitting Diodes (LED), light arrays, and the like. Display interface 214 may include both hardware and software components. For example, display interface 214 may include a graphic accelerator for rendering graphic-intensive outputs on the display unit. In one embodiment, display interface 214 may include software and/or firmware components that work in conjunction with CPU 204 to render graphic output on the display unit.

Audio interface 216 is arranged to produce and receive audio signals such as the sound of a human voice. For example, audio interface 216 may be coupled to a speaker and microphone (not shown) to enable communication with a human operator, such as spoken commands, and/or generate an audio acknowledgement for some action.

Input devices 218 may include a variety of device types arranged to receive input from a user, such as a keyboard, a keypad, a mouse, a touchpad, a touch-screen (described with respect to display interface 214), a multi-touch screen, a microphone for spoken command input (describe with respect to audio interface 216), and the like.

I/O processor 220 is generally employed to handle transactions and communications with peripheral devices such as mass storage, network, input devices, display, and the like, which couple computing device 200 with the external world. In small, low power computing devices, such as some mobile devices, functions of the I/O processor 220 may be integrated with CPU 204 to reduce hardware cost and complexity. In one embodiment, I/O processor 220 may the primary software interface with all other device and/or hardware interfaces, such as optical storage 202, hard disk 232, interfaces 226-228, display interface 214, audio interface 216, and input devices 218.

An electrical bus 222 internal to computing device 200 may be used to couple various other hardware components, such as CPU 204, memory module 206, I/O processor 220, and the like, to each other for transferring data, instructions, status, and other similar information.

Non-volatile memory 224 may include memory built into computing device 200, or portable storage medium, such as USB drives that may include PCM arrays, flash memory including NOR and NAND flash, pluggable hard drive, and the like. In one embodiment, portable storage medium may behave similarly to a disk drive. In another embodiment, portable storage medium may present an interface different than a disk drive, for example, a read-only interface used for loading/supplying data and/or software.

Various other interfaces 226-228 may include other electrical and/or optical interfaces for connecting to various hardware peripheral devices and networks, such as IEEE 1394 also known as FireWire, Universal Serial Bus (USB), Small Computer Serial Interface (SCSI), parallel printer interface, Universal Synchronous Asynchronous Receiver Transmitter (USART), Video Graphics Array (VGA), Super VGA (SVGA), and the like.

Network Interface Card (NIC) 230 may include circuitry for coupling computing device 200 to one or more networks, and is generally constructed for use with one or more communication protocols and technologies including, but not limited to, Global System for Mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols.

Hard disk 232 is generally used as a mass storage device for computing device 200. In one embodiment, hard disk 232 may be a Ferro-magnetic stack of one or more disks forming a disk drive embedded in or coupled to computing device 200. In another embodiment, hard drive 232 may be implemented as a solid-state device configured to behave as a disk drive, such as a flash-based hard drive. In yet another embodiment, hard drive 232 may be a remote storage accessible over network interface 230 or another interface 226, but acting as a local hard drive. Those skilled in the art will appreciate that other technologies and configurations may be used to present a hard drive interface and functionality to computing device 200 without departing from the spirit of the present disclosure.

Power supply 234 provides power to computing device 200. A rechargeable or non-rechargeable battery may be used to provide power. The power may also be provided by an external power source, such as an AC adapter or a powered docking cradle that supplements and/or recharges a battery.

Transceiver 236 generally represents transmitter/receiver circuits for wired and/or wireless transmission and receipt of electronic data. Transceiver 236 may be a stand-alone module or be integrated with other modules, such as NIC 230. Transceiver 236 may be coupled with one or more antennas for wireless transmission of information.

Antenna 238 is generally used for wireless transmission of information, for example, in conjunction with transceiver 236, NIC 230, and/or GPS 242. Antenna 238 may represent one or more different antennas that may be coupled with different devices and tuned to different carrier frequencies configured to communicate using corresponding protocols and/or networks. Antenna 238 may be of various types, such as omni-directional, dipole, slot, helical, and the like.

Haptic interface 240 is configured to provide tactile feedback to a user of computing device 200. For example, the haptic interface may be employed to vibrate computing device 200, or an input device coupled to computing device 200, such as a game controller, in a particular way when an event occurs, such as hitting an object with a car in a video game.

Global Positioning System (GPS) unit 242 can determine the physical coordinates of computing device 200 on the surface of the Earth, which typically outputs a location as latitude and longitude values. GPS unit 242 can also employ other geo-positioning mechanisms, including, but not limited to, triangulation, assisted GPS (AGPS), E-OTD, CI, SAI, ETA, BSS or the like, to further determine the physical location of computing device 200 on the surface of the Earth. It is understood that under different conditions, GPS unit 242 can determine a physical location within millimeters for computing device 200. In other cases, the determined physical location may be less precise, such as within a meter or significantly greater distances. In one embodiment, however, a mobile device represented by computing device 200 may, through other components, provide other information that may be employed to determine a physical location of the device, including for example, a MAC address.

Figure 3:
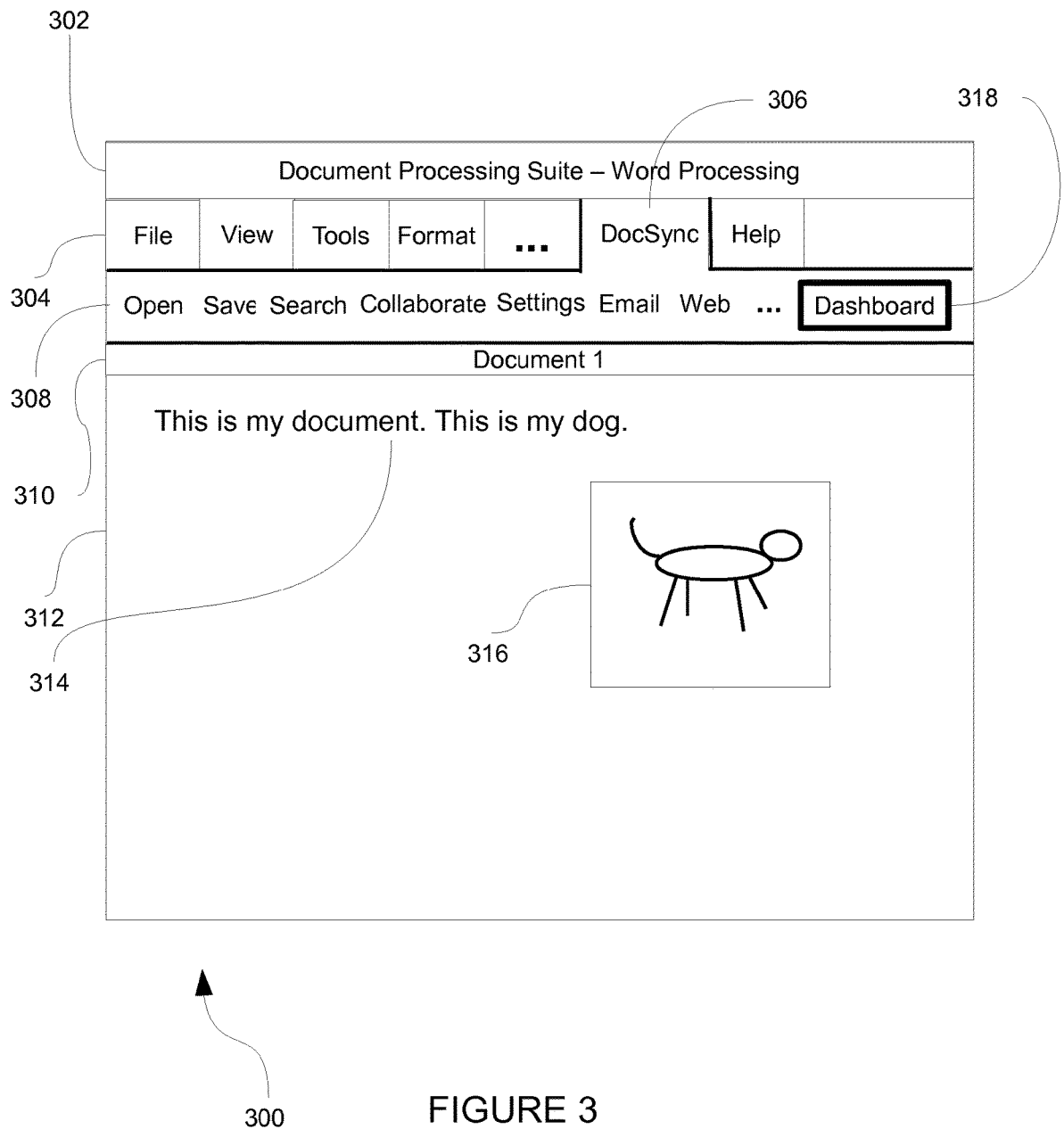
FIG. 3 shows an example integrated document processing interface for editing documents usable with the computing device of FIG. 2.

FIG. 3 shows an example integrated document processing interface for editing documents usable with the computing device of FIG. 2. In various embodiments, the integrated word processing interface 300 includes title 302, set of menus 304, plug-in component 306 having set of buttons 308 for activation of various functions including dashboard button 318, document 312 with title 310, text 314, and multimedia data 316.

In various embodiments, plug-in component 306 may appear as a toolbar, a new menu, or other common user interface components integrated with one or more applications within the document processing suite. Those skilled in the art will appreciate that plug-in component 306 may be implemented as one or more modules, each module providing different functionalities for the plug-in component as further detailed below. Applications within the document processing suite may include word processing, spreadsheet, email/calendar, and slide presentation programs, among others. Those skilled in the relevant arts will appreciate that plug-in or add-in components are generally software components that run within another host program to add various capabilities, such as playing video clip players, encrypting content, messaging, and the like, within the host application originally lacking such capabilities. Plug-in components are useful at least because they may be deployed by third parties onto existing host applications after the release of such applications by their manufacturers. Plug-ins are usually installed by users after installation of the host application. A host application may generally provide a service interface (or API—Application Programming Interface) for use by plug-in components to register themselves and exchange data with the host application. Plug-ins may be implemented using DLLs (Dynamic Link Library) which are components that may be dynamically added to a running program and provide various callable functions and capabilities.

In various embodiments, plug-in component 306 generally provides capabilities which do not exist in the host program. For example, collaboration and image search functions may not be available in the host applications, but are added by the plug-in.

A number of online service providers exist, such as third party collaboration servers, which provide document management systems and collaboration services for co-authoring documents. A user may sign up with one or more of the online or web based document management and collaboration platforms, or use an enterprise server (a server within a large corporate environment or other organization, such as a government organization) to create an online storage home directory for her documents. Once the user launches the integrated document processing suite with the plug-in component 306 installed, the corresponding toolbar, menus, and/or buttons allow the user to store, find, and retrieve her files from specific service providers with which the user has registered. Each service provider may require the user to enter her credentials, for example, via a dialog box, before allowing the user access to her files. Service providers are further described below with respect to FIGS. 8A and 8B.

In various embodiments, plug-in component 306 may use the service provider's API to specify the file and folder structure. Using such API, plug-in component 306 enables users to create new folders, rename files and folders, change file access and processing (for example, read, write, delete, and the like) permissions, and take other actions enabled by the API. In effect, the distributed services provided by the service providers in conjunction with the document processing suite appear to the user as working on files and folders on the user's local computer.

In various embodiments, when the user clicks on or selects the "open" button on the set of buttons 308, the user is presented with a control that shows him the list of folders and files, which may be on the user's local computer or from the remote servers of the service providers. The user can navigate and filter the files based on specific metadata such as file type, collaborators, size, folder and more, and thereafter select a file to open. Once the user selects a file, the document is downloaded and/or converted to an office format and opens in the corresponding office application, such as word processing, spreadsheet, and the like.

In various embodiments, the metadata is sourced from a collaboration server and/or local metadata. In other various embodiments, as part of a discovery process, metadata is automatically and/or dynamically discovered for and updated in a dashboard area further described below with respect to FIG. 6 and other figures. Discovered metadata by one client computing device may be communicated to remote servers and/or other client computing devices for update, display, or storage. As status of different files, projects, resources, people, schedules, and other similar project related entities and information change, metadata describing such information and their status may be actively monitored, searched for, discovered, or otherwise ascertained and updated in corresponding sections of the dashboard area. Additional metadata not existing in the dashboard area at a given time may later be added automatically as new information is discovered through the discovery process of metadata described above. For example, in some embodiments, an autonomous software agent may roam various servers and sources of information to find metadata related to a document or file being edited by a user. As the software agent discovers new information, the software agent communicates such information to the plug-in component of one or more remote clients for display in the corresponding dashboard areas. In other various embodiments, plug-in component 306 actively searches for and discovers new metadata, for example, by querying data stores on remote servers or other client computing devices.

In various embodiments, when the user clicks on or selects the "Save" or "Save as" button on the set of buttons 308, the user is presented with a list of folders and/or files, which may be on the user's local computer or from the remote servers of the service providers. The user may provide a filename, selects where she wants to save the file, and save it. Plug-in component 306 typically uses the appropriate service provider's API to upload and/or convert the file and store it on the remote server, in a manner that may be transparent to the user. As the user modifies the document she is working on, she can occasionally save the document. In some embodiments, plug-in component 306 may only save the changes (delta) to the user's document made since last save on the remote server to save time and resources. In other embodiments, each save may result in a complete transfer and saving of the document being edited.

In various embodiments, plug-in component 306 may provide a document search button, which the user may use to find documents both locally and on remote service providers' servers. In various embodiments, plug-in component 306 integrates and provides document search functionality for finding documents stored on remote web based collaboration platforms operated by service providers. The search function may allow users to retrieve files by keyword search, URL (Uniform Resource Locator), server, directory pathname, database relational queries, and the like. Upon locating the desired file, plug-in component 306 downloads the file from the remote server to the user's computer for processing. Image and web search capabilities are described below with respect to FIGS. 4A and 4B.

In various embodiments, the "Collaboration" button in the set of buttons 308 may be selected by the user to collaborate on or co-author a particular document with other remotely located people. In one embodiment, the user may use the "Settings" button to add names, emails, and permission levels for people with whom the user wants to grant permission to access and/or collaborate on the particular document. In other embodiments, plug-in component 306 may enable collaboration between multiple users by using permissions associated with a file intended for coauthoring. When a user saves the file on the service provider's remote server, the user may add the emails and names of the people with whom he wishes to collaborate in a Save dialog box. Once the file is saved, plug-in component 306 may utilize the service provider's API to associate collaboration permissions with the file according to the user's specification.

After the file is saved on the remote server, the Collaborate button allows the user to collaborate with the people who have been given permission to access the file. In other embodiments, the other users who have been given permission by a different user to collaborate on a particular file will be notified or otherwise detect that they have access to the particular file for collaboration. For example, a file collaboration icon may be added to the file directory listing of the particular file, which is visible to the other users to indicate that the other users now have collaboration permission on the particular file.

In some embodiments, different metadata are displayed on different collaborating users' local dashboard areas depending on permission settings, user's preference and/or selection of metadata desired to be displayed, user's function in the collaboration project, system/network throughput and/or efficiency, cost of data transmission, or other considerations. For example, a junior author and/or his client device may be granted permission to view a limited set of metadata associated with the particular document being edited, while a senior author may be granted additional privileges for access to the metadata. Such metadata permissions are generally associated with both the metadata and the client computing device of a particular user/author.

In various embodiments, co-authoring is platform-agnostic and may be used with any platform, such as SharePoint or other similar platforms, rather than being specific to a particular platform. In other various embodiments, multiple users participating in co-authoring a particular document, each may use the same or different document processing suites. For example, one user may use Microsoft Office with a corresponding plug-in component 306, while another user may use Open Office with a corresponding plug-in component 306 to author the same document. In various embodiments, the "Email" button in the set of buttons 308 may be used to launch an email dialog box for checking, sending, and receiving emails. In one embodiment, selecting the Email button launches the email/calendar program of the document processing suite, while in other embodiments, a limited email interface, for example, in the form of a dialog box running within the currently used application of the document processing suite (as opposed to launching a distinct office application, such as an email/calendar application), may be presented to the user for basic email activities.

In various embodiments, the "Web" button in the set of buttons 308 may be selected to launch a separate browser program. In some embodiments, the browser may be a full function browser hosted within the document processing suite, while in other embodiments, a limited browser dialog box may be presented for basic browsing without other functions such as applet hosting, script support, and the like. Browser functions are further described with respect to FIG. 4B.

The "Search" button in the set of buttons 308 may be selected to use expanded search capabilities include image searches and web searches. Additionally, third party content providers may integrate their search services with plug-in component 306 search functionality, as is more fully described below.

Figure 4A:
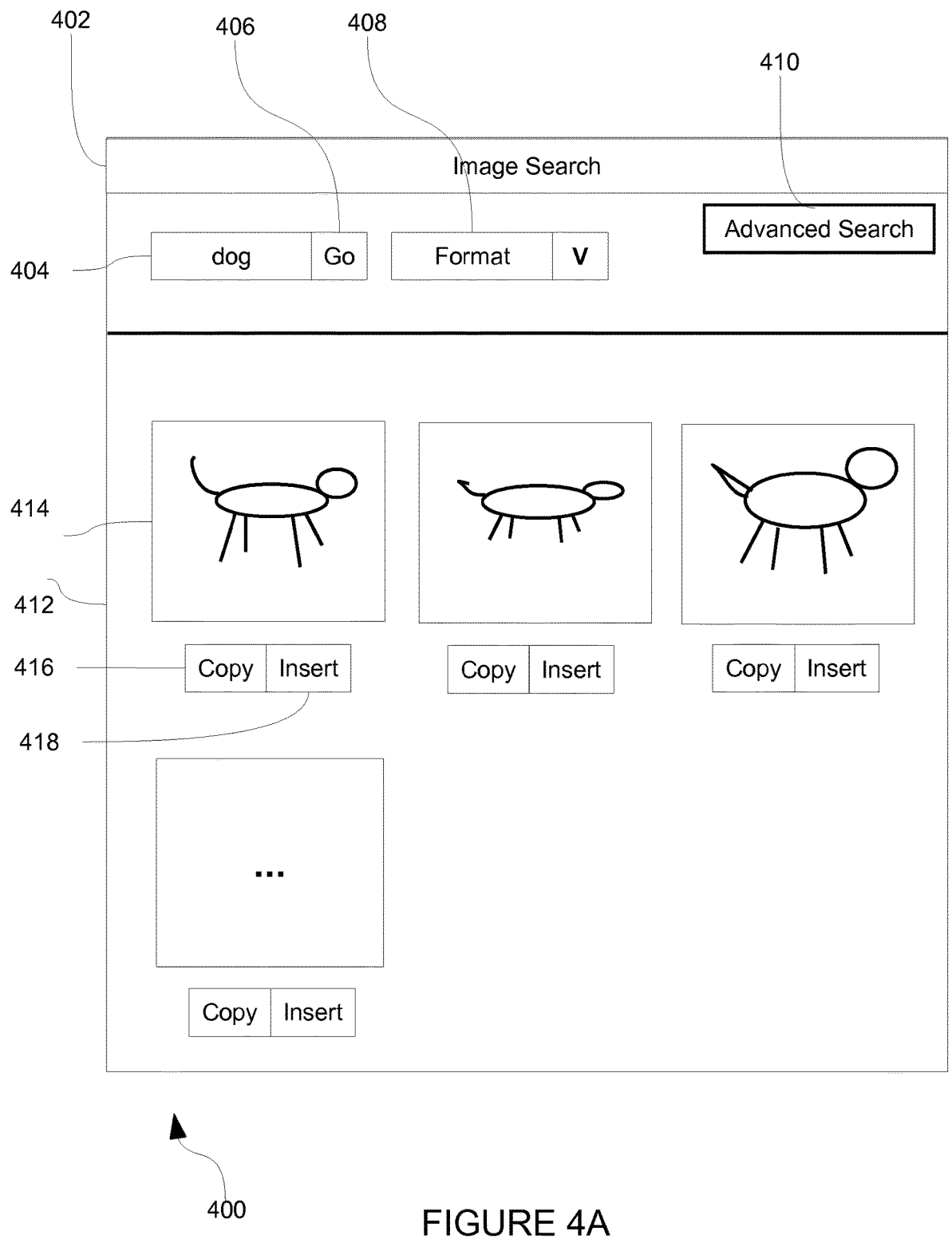
FIG. 4A shows an example image search dialog usable with the integrated document processing interface of FIG. 3.

FIG. 4A shows an example image search dialog usable with the integrated document processing interface of FIG. 3. In various embodiments, image search dialog box 400 includes an image search title 402, search input field 404, search button 406, an image format pick list 408, an advanced search button 410, and a result section 412 including returned images 414 each having a copy button 416 and an insert button 418.

An image search is different from text search or other web search in that the returned results are generally in the form of images. For example, a web search with keyword "dog" will return results that typically include text articles, pet shops, dog foods, veterinarians, may be some images of dogs, and the like. But, an image search with the same keyword will typically return only images of dogs. In various embodiments, image search dialog box 400 may pop up for user upon selection of search button from the plug-in 306 (FIG. 3) set of buttons 308.

Existing office software applications provide limited search capabilities, typically embedded in the office software and/or from a limited number of websites with which the office software communicate for obtaining additional data. This closed or limited service environment limits the user accordingly in what additional data he may obtain from within the office software environment. In various embodiments, the search function of plug-in component 306 (FIG. 3) searches the web for images using commercial search engines, such as Google® and Yahoo®. Search engine API may be used to filter search results according to intellectual property rights, such as copyright and trademark. As such, the search functionality of plug-in component 306 makes it unnecessary for the user to open a separate browser application distinct from the office suite to search the web, obtain results, and then copy and insert such results into his working documents within the office suite, thus, saving time and providing convenience for the user.

In various embodiments, an image search generally starts with activating the search button in the set of buttons 308 (FIG. 3). Image search dialog 400 is presented to the user to input his search query into search input field 404. The user may select image format, for example jpeg, bitmap, tiff, and the like, from pick list 408. The user may also select advanced search button 410 to view additional input fields and/or other pick options and settings to be used as criteria to further restrict the search. For example, in the advanced search settings, the user may include or exclude a date range, a particular source, image size, image resolution, and the like. The search query thus entered by the user is passed on to the appropriate search engine, such as Google, Yahoo, and the like, to execute and return the results.

Once the results are retrieved by the search engine, the results are passed back to image search dialog of the plug-in component 306, for example, using the search engine's API to render the results in a software control component, such as an ActiveX control, a Java applet, and the like, that displays a gallery of thumb nail images (small preview images). The results may include appropriate metadata about each of the images, such as date of creation, author/creator, legal rights, resolution, format, and the like. The metadata may be used, either automatically or by the user, to filter, sort, arrange, group, or otherwise manipulate the results into a final selection of images. In various embodiments, the user may browse the images and copy and insert, using buttons 416 and/or 418, one or more of the finally selected images into the document the user is editing. Thus, the user is enabled to search the web from within the document processing suite environment, without launching other applications like browsers, for desired images and insert the search results in his documents.

Figure 4B:
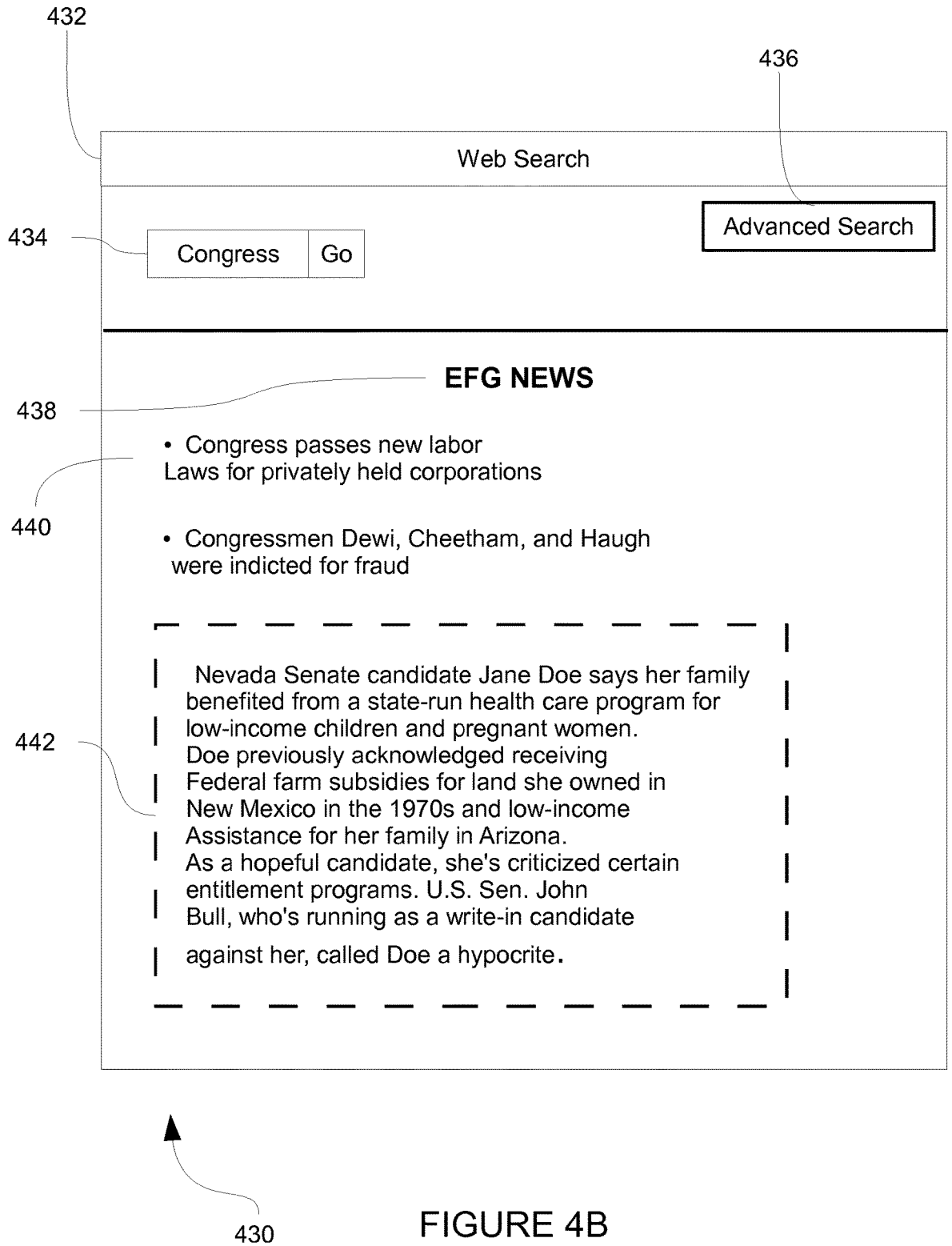
FIG. 4B shows an example web search dialog usable with the integrated document processing interface of FIG. 3.

FIG. 4B shows an example web search dialog usable with the integrated document processing interface of FIG. 3. In various embodiments, web search dialog box 430 includes web search title 432, search input field 434, advanced search button 436, results section 440 possibly showing a web page 438 including contents that may be selected by the user as indicated by selected portion 442.

In various embodiments, in a manner similar to image search described above with respect to FIG. 4A, the search function of plug-in component 306 (FIG. 3) searches the web for relevant results using commercial search engines, such as Google® and Yahoo®. Search engine API may be used to filter search results according to intellectual property rights, such as copyright and trademark. As such, the search functionality of plug-in component 306 makes it unnecessary for the user to open a separate browser application distinct from the office suite to search the web, obtain results, and then copy and insert such results into his working documents within the office suite, thus, saving time and providing convenience for the user.

In various embodiments, a web search generally starts with activating the search button in the set of buttons 308 (FIG. 3). Web search dialog 430 is presented to the user to input his search query into search input field 434. The user may select advanced search button 436 to view additional input fields and/or other pick options and settings to be used as criteria to further restrict the search. For example, in the advanced search settings, the user may include or exclude a date range, a particular source, type of articles or web pages, age of web pages, and the like. The search query thus entered by the user is passed on to the appropriate search engine, such as Google, Yahoo, and the like, to execute and return the results.

Once the results are retrieved by the search engine, the results are passed back to image search dialog of the plug-in component 306, for example, using the search engine's API to render the results in a software control component, such as an ActiveX control, a Java applet, and the like, that displays the results. The results may include appropriate metadata about each of the items in the results, such as date of creation, author/creator, legal rights, age of web page, URL, relevance score, and the like. The metadata may be used, either automatically or by the user, to filter, sort, arrange, group, or otherwise manipulate the results into a final selection of items. In various embodiments, the user may browse the results and select an item, for example, by double-clicking on the item, for full display. In various embodiments, the results selected for full display may be displayed as full web pages as rendered on an independent browser application, but within the computing environment of the plug-in component 306 (FIG. 3). The user may select portions of the displayed web page, for example, selected portion 442, for copying and/or pasting into his document. Thus, the user is enabled to search the web for desired results and web pages from within the document processing suite environment, without launching other applications like browsers, and insert selected portions of the search results into his documents.

In various embodiments, the search functionality of plug-in component 306 may be extensible to enable a third party provider, such as a content provider, a search engine provider, or an independent software vendor (ISV), to integrate its search features with the plug-in component search functionality. With such integration, the third party provider may include its content into the search results of the plug-in component's search queries. In various embodiments, an extension API associated with the plug-in component 306 may enable the third party providers to include their content with the search results. Such third party content includes, but is not limited to images and other types of content, such as documents, web pages, document templates, and the like.

Figure 5:
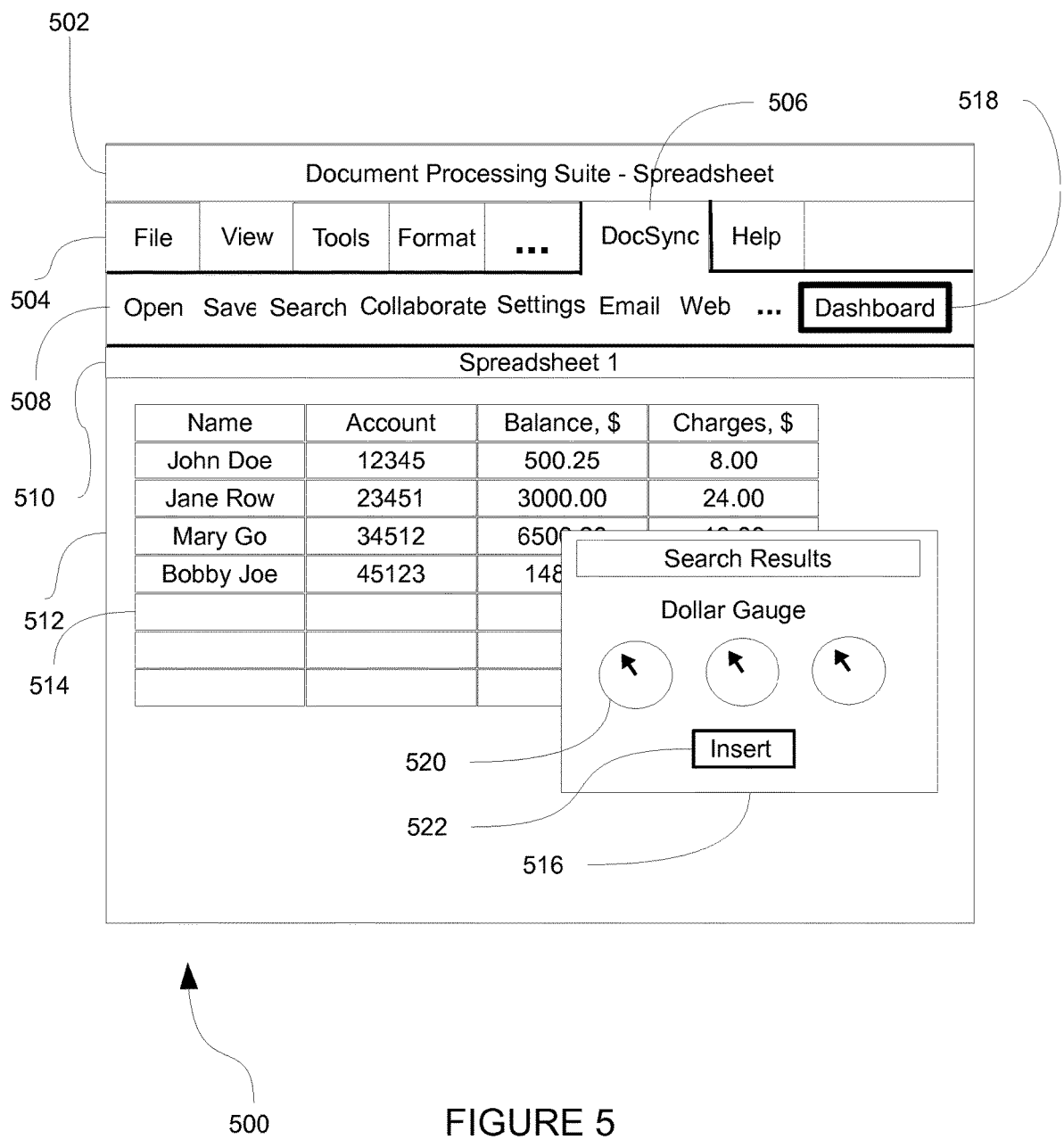
FIG. 5 shows an example integrated document processing interface for spreadsheet applications usable with the computing device of FIG. 2.

Conversely, in some embodiments, documents authored or modified in a document processing suite integrated with plug-in component 306, may save such documents on web based, third party provider platforms, such as Google Apps, Google Docs, Cisco webex, IBM lotusLive, EMC, and the like. This way, plug-in component 306 integrates seamlessly between office applications and web content management or document management and collaboration platforms. Once the user's documents are saved on the third party provider's servers, plug-in component 306 enables users to retrieve the saved files over a computer network and open them directly in any of the office programs as if the files were saved locally on the user's computer. FIG. 5 shows an example integrated document processing interface for spreadsheet applications usable with the computing device of FIG. 2. In various embodiments, spreadsheet application 500 of the document processing suite includes 502, tabs or menus 504, plug-in component 506 (similar to plug-in component 306 of FIG. 3) having a set of buttons 508 including dashboard button 518, document title 510, spreadsheet document 512, spreadsheet table 514, and gadget 516 having gauges 520 and insert button 522.

Figure 6:
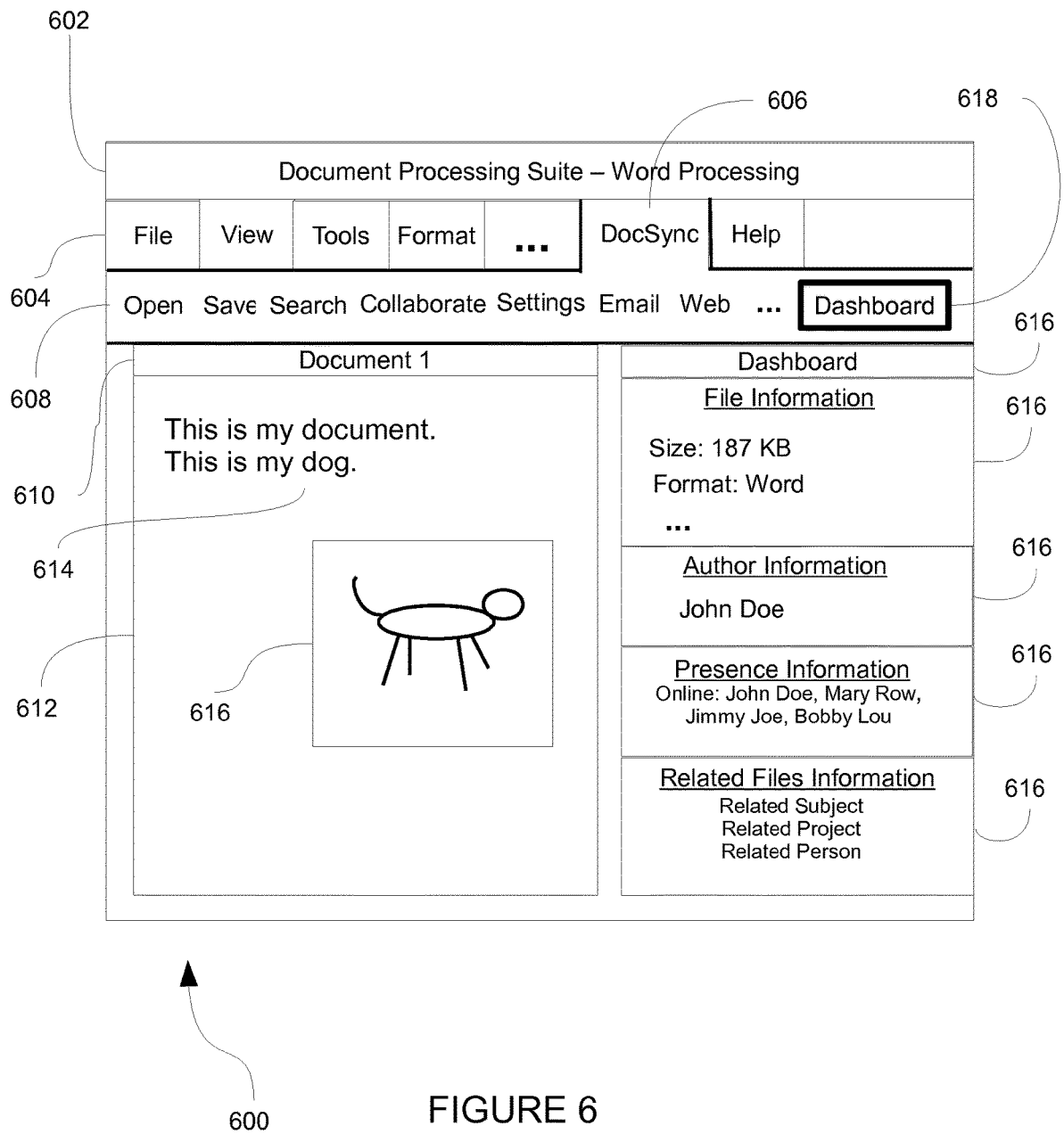
FIG. 6 shows the example integrated document processing interface of FIG. 3 including a dashboard with metadata.

In various embodiments, web applications, or "web apps," may be integrated with office applications via the instrumentality of plug-in component 306. Web applications are specialized applications configured to run within a host program, such as Java applets that run within a browser program. Thousands of web apps exist that perform many different tasks including games, computations, different utilities, displays for various types of data, and the like. Mini web applications, such as Google Gadgets, SharePoint Web parts, portlets and other hosted web applications are designed to live in a web browser and primarily extend web based functions. For example, Google Gadgets are mini web applications that were designed also to extend the functionality of Google Does by third party developers. Plug-in component 506 enables the execution of web apps within the office applications, with or without sourcing the data from the office application. For example, a gadget may integrate with a spreadsheet to read data from the spreadsheet and visualize the data in charts, pivot tables, and the like. In a typical scenario, a user of spreadsheet 500 may search the web and find a dollar gauge web app embodied in gadget 516, and insert the web app, using insert button 522, into table 514 to display dollar amounts in a graphical format (as opposed to a numerical format as is commonly used in tables) within table 514. Gadget 516 may source the data, depending on its settings and/or its original type, it displays from a local office file or from a remote server and graphically display the sourced data. FIG. 6 shows the example integrated document processing interface of FIG. 3 including a dashboard with metadata. In various embodiments, the integrated word processing interface 600 includes a title 602, a set of menus 604, a plug-in component 606 having a set of buttons 608 for activation of various functions including a dashboard button 618, a document 612 with a title 610, text 614, and multimedia data 616. Additionally, upon activation of dashboard button 618, a dashboard panel 620 is presented having different metadata presentation areas such as file information 622, author information 624, presence information 626, and related files information 628.

Those skilled in the art will appreciate that many other types of metadata associated with document 612, the user, an associated project, and the like may be presented in the dashboard area, such as date of creation, participants in the project, contact information, history of document changes, and the like. Furthermore, those skilled in the art will appreciate that although a text and graphics document is discussed herein, the descriptions about dashboard are substantially applicable to other office applications such as spreadsheet, presentation, and other document processing applications.

In various embodiments, metadata associated with the document being authored by a user may be retrieved from local and/or remote sources and displayed on the dashboard. Such metadata may be embedded in the document itself, be associated with document name/identification in a database, or otherwise be accessible. In various embodiments, file metadata is read-only, while in other embodiments, file metadata is read/write and may be modified by the user with the appropriate permissions. In still other embodiments, some portions of the metadata is read only, such as file creation date, while others, such as file permissions may be modified.

File information 622 metadata may include filename, file size, format, creation date, change history, permissions settings, and the like. Such information may typically be embedded in the document file itself and/or be calculated from the document file data. In some embodiments, a "call home" metadata may be added to the file that allows a locally stored filed to know what the source of the file is on the server. Such metadata enable transparent and consistent co-authoring of the same document by multiple authors. The call-home metadata help maintain a logical connection to the server such that two authors from different computers accessing the same file locally on their respective computers, perceive their respective local files as being the server copy of the same file.

Author information 624 metadata may include name of a primary author or document owner, collaborators, edit history for each author, and the like.

Presence information 626 metadata may include the names and contact information, such as email and title, of collaborating authors for document 612, and the current online presence status of each author. For example, if John Doe is currently online but others are not, then an icon or similar indicator, such as color, may display their presence and availability accordingly.

Related files information 628 metadata may include a number of subfields, such as related subject, related project, and related person areas for displaying information about files with related subject matter to document 612, project information involving document 612 or one of its users/authors, and people associated with document 612 or its authors, such as project managers, respectively. In various embodiments, automatic searches may be performed to find and display in the dashboard area related files, related subjects, related projects, or related people associated with document 612.

In various embodiments, dashboard 620 may also be used to display real time communications between multiple collaborators or coauthors. Furthermore, the metadata may be dynamically updated as various data change, such as the size of file during editing. Still further, the display of metadata may be dynamically changed to indicate various conditions, such as alarms (for example, for unauthorized attempts to access the document), alerts (for example, project meeting time based on office calendar application data), and the like. The various conditions may be indicated via color changes, icon changes, and via use of other similar visual or audible indicators. Real time collaboration among multiple authors is further described below with respect to FIG. 7A.

Figure 7A:
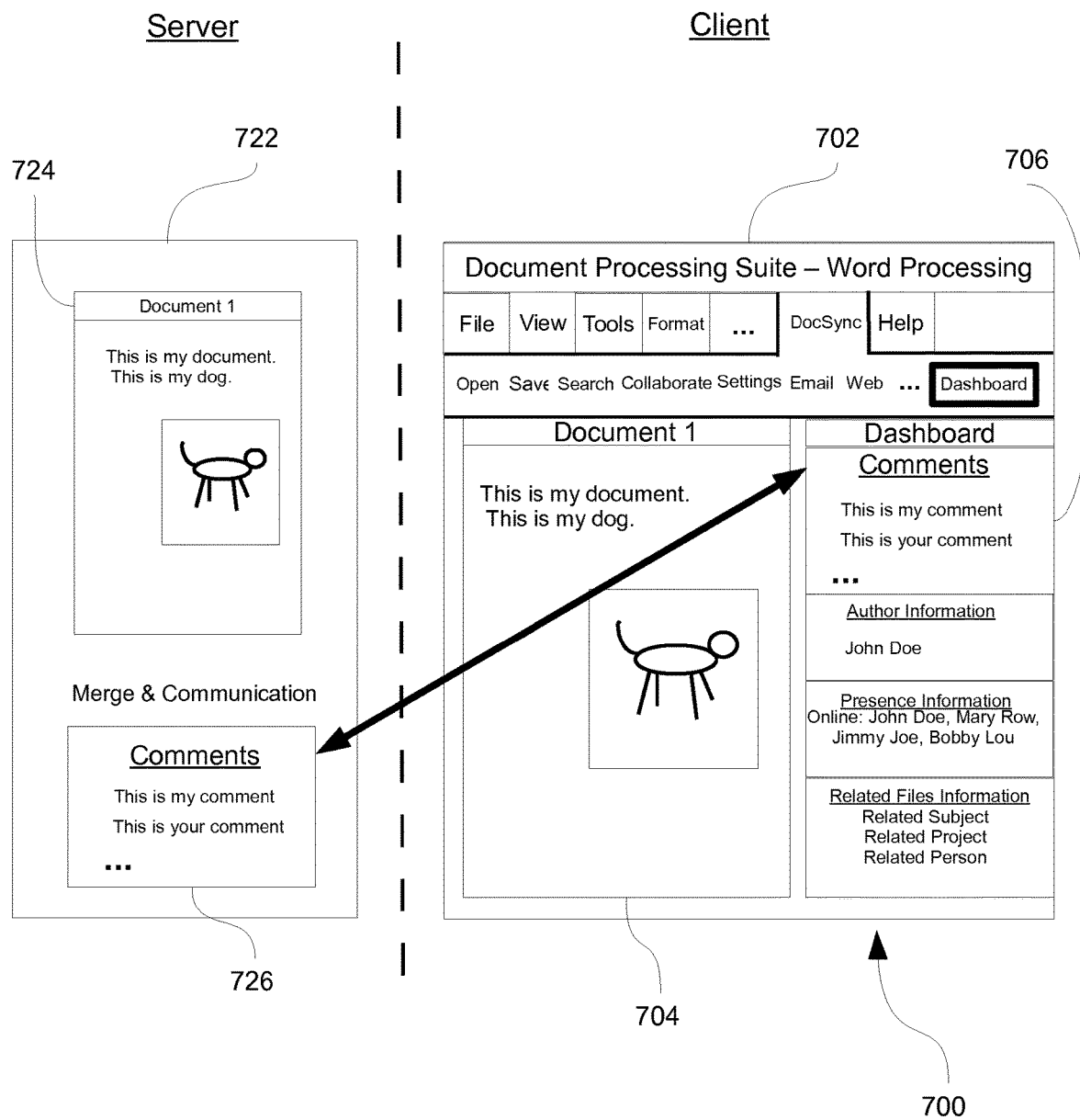
FIG. 7A shows an example client-server computing environment with communication between the server and the dashboard on the client.

FIG. 7A shows an example client-server computing environment with communication between the server and the dashboard on the client. Server view 722 includes a master document 724 and a merge and communication module 726. In various embodiments, the server is in communication with client 700 via a computer network. Client view 702 includes document copy 704, and dashboard 706 including multiple fields as shown and described previously. In various embodiments, the server devices and user client devices described with respect to FIG. 7A are substantially similar to those described with respect to FIG. 2.

In various embodiments, multiple clients and/or users connect with the server to edit copies of a single document. A master copy of the single document exists on the server and copies of the master document are downloaded to the client devices corresponding to the users. Those skilled in the art will appreciate that a "master copy" is generally a main version of a document to which all other copies and/or versions of the same document are subordinate. Generally, the master document includes all the latest approved and/or valid changes to the particular document and such changes take precedence over any changes in any of the subordinate versions of the particular document. The multiple users may communicate with each other via the server, which relays their communications to the other users. The communications between the users may or may not be related to the document currently being edited. The comments appear in real time in the appropriate comment area of dashboard 706 of each client device. Comments entered by the users onto their respective dashboard comment areas are similarly downloaded to the server for relay to the other user's client devices. Comments from each user may be identified by various techniques such as user identifiers, different colors, different icons, avatars, and the like.

In various embodiments, the servers, and/or the service providers, which provide the servers, provide API for client devices to communicate with the servers. Plug-in component 606 (see FIG. 6) on the client side may include multiple APIs for communicating with different ones of multiple third party and unrelated collaboration services, selectable by the user and/or by automatic detection of the type of the connected server/service. In the absence of plug-in component 606 and its ability to communicate with different third party collaboration services and platforms through different corresponding APIs, using multiple disparate and incompatible collaboration services may not be possible. A dedicated server-side software merge and communication module may run on the servers for communication with the plug-in components to implement a distributed document merge and client communication process, as further described below. Those skilled in the art will appreciate that the server side merge and communication module may be included in a single module or be decomposed into multiple modules.

In various embodiments, local document copies on user client devices are independently edited by respective users collaborating and coauthoring the same document. Periodically, each client device communicates with the server to query the status of the master document and determine whether other client devices or users have made changes that are now included in the master document. Changes included in the master document may be signified by timestamps, flags, hash functions, CRC (Cyclic Redundancy Check), and other similar techniques for detecting and/or recording changes to data or document contents.

Additionally, each client device communicates with the server the changes made to the local copy of the document on each client device itself. In response, the server records such changes, for example, in a time-stamped database, and incorporates the changes made by each client device and communicates to each client device the changes made by other users. If there are changes made to the master document by other users, each client device downloads such changes made to the master document from the server to update each client device's own local copy. Those skilled in the art will appreciate that such communications between the client and the server may be initiated by either side, the client or the server, via the use of APIs, by actively querying the occurrence of an event, such as a document change, or sending a message to inform the other side of the occurrence of the event. In some embodiments, on a particular platform or document processing suite, such as Microsoft's Office suite, a merge feature of the particular document processing suite may be used to perform the merge function once the document is downloaded to the client computing device.

In the alternative, each client device downloads the whole updated master document including changes from other clients/users and replaces its own local copy of the document with the updated master document. In some embodiments, a file may be downloaded from the server to a local client computing device by a user, be locally merged with a corresponding local file currently being worked on by a user, and the combined result of the merge be shown to the user. This way, all local copies of the document are dynamically synchronized and merged. This technique allows local copies of the document on the client devices to maintain consistency with each other and with the master copy of the document in substantially real time. In effect, each user working on the user's local copy of the document sees all the changes made by other users who are simultaneously and remotely working on other copies of the same document. The above embodiments implement a distributed document merge algorithm with no central control of the whole merging and update process.

In various embodiments, the changes made by a second user to a local copy of a particular document on the second user's client device are communicated, by the server, to a first user's client device and then merged with the first user's local copy of the particular document on the client device of the first user, while in other embodiments, the actual document merge takes place on the server and then communicated to the first user's client device.

In various embodiments, user and/or client devices coauthoring the same document may be assigned different priorities. The changes made by a user having a higher priority take precedence over changes made by another user having a lower priority, if such changes create a conflict. In other embodiments, all users have the same priority and the changes made last are included in the master document and then propagate to all local copies as described above. In the latter embodiments, in effect, timestamp of the changes determine the priority, with the latest timestamp having the highest priority.

In various embodiments, the servers are provided by different service providers. Each service provider may have a master copy of the document and server a number of clients. Each client can also use the services of a number of service providers. Consistency of multi-authored documents may be maintained among multiple master copies on the servers of the corresponding multiple service providers by merging the documents as further described below with respect to FIGS. 8A and 8B.

In various embodiments, client devices may work off-line (not connected to the servers via computer networks). Changes made to documents by the user on the client copy of the document, are cached continuously in the background without user intervention and are later merged with changes made by other users to their respective copies of the same document upon reconnection to the servers via computer networks, as described above.

The descriptions above with respect to FIG. 7A are substantially similarly applicable to documents used by other office applications, such as spreadsheets.

Figure 7B:
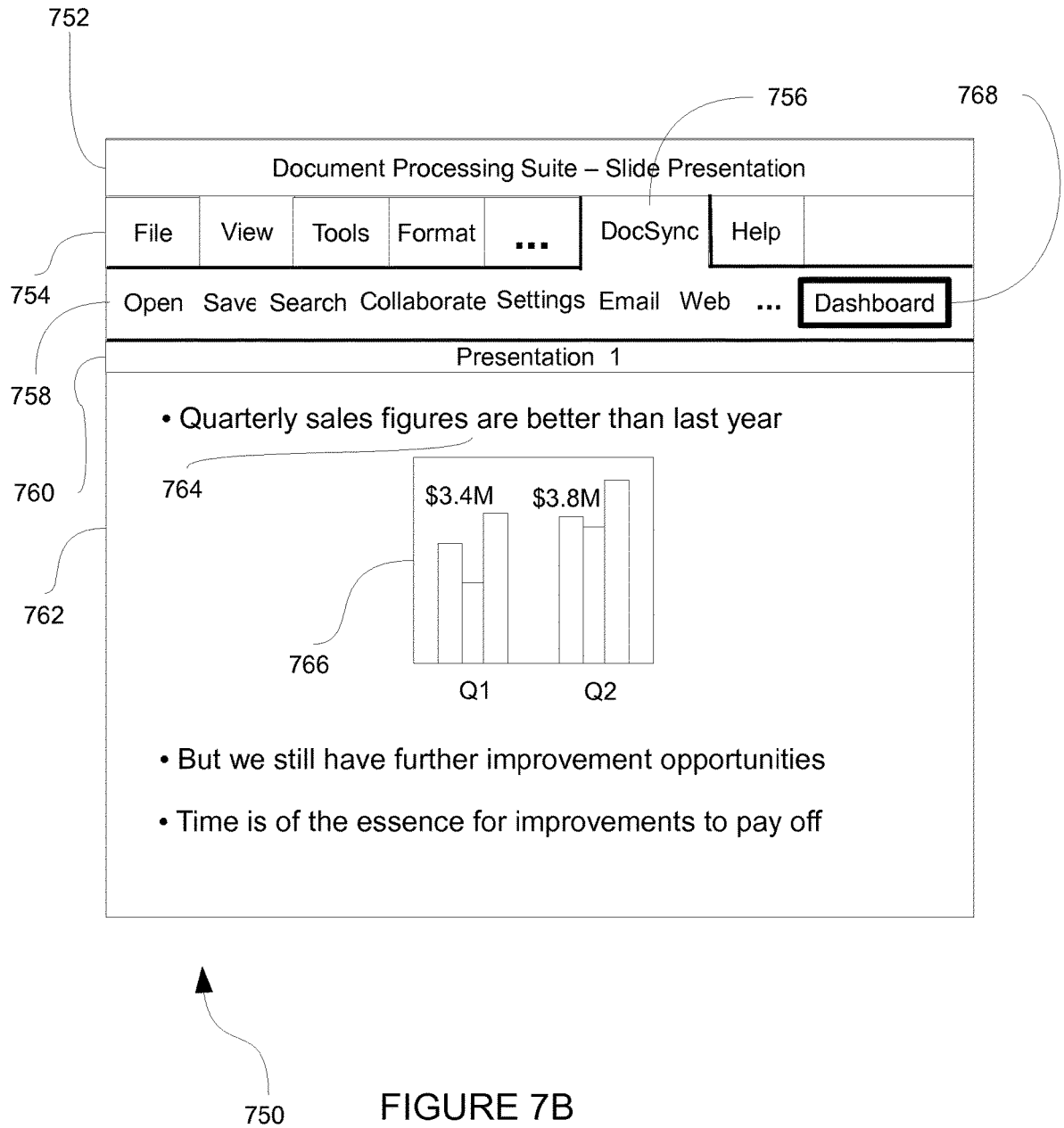
FIG. 7B shows an example integrated document processing interface for slide presentation applications usable with the computing device of FIG. 2.

FIG. 7B shows an example integrated document processing interface for slide presentation applications usable with the computing device of FIG. 2. In various embodiments slide presentation application interface 750 of document processing suite includes title 752, set of menus 754, plug-in component 756 having set of buttons 758 for activation of various functions including dashboard button 768, slide presentation document 762 with title 760, text 764, and multimedia data 766. The set of menus, plug-in component, set of buttons and dashboard button have substantially the same functionality as described above with respect to FIG. 3.

In various embodiments, multiple users may collaborate as coauthors on slide presentation document 762 substantially as described above with respect to FIG. 7A above. The merge algorithm of slides may differ from other document types in some ways due to the relatively more graphical nature of slides compared with other documents. For example, in a text document, changes to a word are relatively easy to detect and update because a word is composed of letters which are uniquely encoded in a computer system, for example, as ASCII (American Standard Code for Information Interchange) code. Whereas, changes to a bar graph are more difficult to detect, record, and merge. As such, in various embodiments, changes to a slide presentation document may be made at slide level granularity by replacing a whole slide (one page) of the slide presentation document rather than a portion of the contents of the slide. In other embodiments, contents of a given slide may be divided into text portions, for example, bulleted comments, and graphical non-text portions, for example, charts, pictures, drawings, and the like. In the latter embodiments, changes to the text portions may be merged as described above with respect to FIG. 7A for text-oriented documents, while the graphical portions may be replaced whole in case of any changes to the graphical portions. In yet other embodiments, changes to the graphical portions of the slide may be tracked and merged with other versions of the slide by image processing techniques. For example, if the graphical portion of the slide is a bitmap image, the changes may be recorded on pixel level and merged with other versions of the slide accordingly.

In various embodiments, at whole slide level granularity (inter-slide), if a first user and a second user are collaborating on a slide presentation document, if the second user changes a particular slide, but the first user does not touch the particular slide, then the particular slide in the first user's copy of the document is automatically replaced by the second user's version of the particular slide. But, if the first user has also touched/changed the particular slide, then in some embodiments or by selected settings, the first user is given an opportunity, for example, via a dialog box, to elect whether to replace the first user's version of the particular slide with the second user's version or not.

In various other embodiments, if both the first and the second user have modified a particular slide, the first user is not given the option to select which version of the particular slide to be used in the slide presentation document. Instead, the two versions of the slide are merged automatically at inter-slide granularity (whole slide), or at intra-slide granularity (portions within slide) as further described below.

At inter-slide granularity, in various embodiments, a priority may be assigned to users to specify which user's version of modifications takes precedence over other users. In these embodiments, the version of the slide modified by the user with the highest priority replaces the other versions modified by other lower priority users.

In various embodiments, the merging of slides is effected by communications between the client devices and the server substantially as described above with respect to FIG. 7A.

In various embodiments, slides in the slide presentation document are identified by unique IDs, hash codes, and the like, generated after each change by each user to keep track of which slides in the document have been touched by which users. Each modified slide is merged with the corresponding slide in each user's local copy of the slide presentation document according to the illustrative procedures and algorithms described above for slide merge.

In various embodiments, if both the first and the second user have modified a particular slide, at intra-slide granularity (contents within a slide), textual and character based contents are merged as described above for text documents with respect to FIG. 7A, while graphical contents are merged by replacing the whole graphical content as a unit, similarly to replacing a whole slide as described above with respect to slide level granularity procedure. In other embodiments, changes to the graphical portions of the slide may also be tracked and merging of the graphical portions be performed with a granularity and scope that covers subparts of the graphical portions. For example, if the graphical portion of the slide is vector based, the changes may be recorded at vector level and merged with other versions of the slide by resolving and merging vector properties, such as direction and length.

Figure 8A:
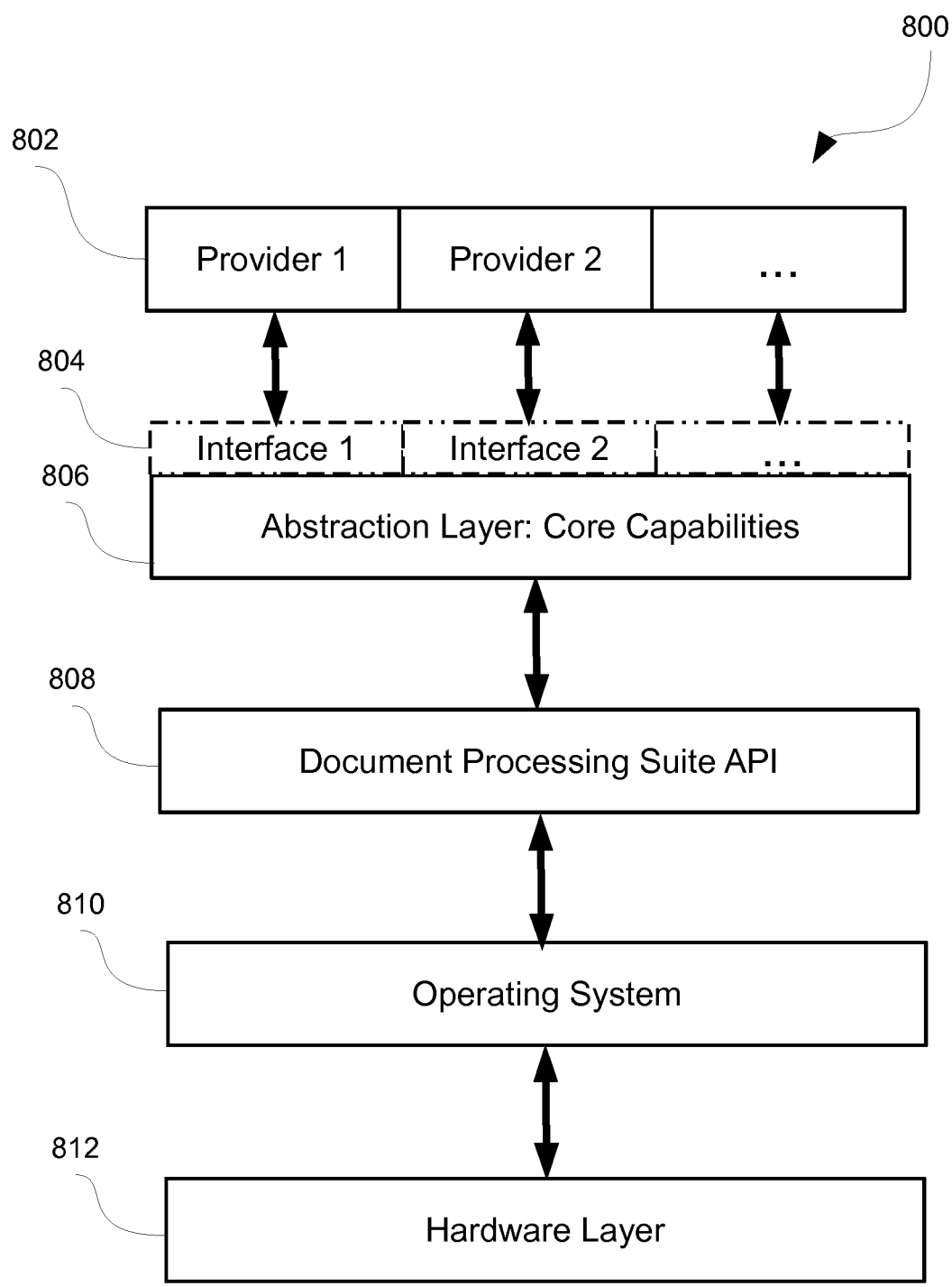
FIG. 8A shows an example system structure for document processing suite applications.

FIG. 8A shows an example system structure for document processing suite applications. In various embodiments, system structure 800 includes multiple providers 802 interfaced with abstraction layer 806 via interfaces 804. Abstraction layer 806 use document processing suite API 808, which may in turn use services of operating system 810 running on hardware layer 812.

By using abstraction layer 806, service providers 802 are shielded from implementation details of lower layers, such as document processing suite API 808 and underlying operating system 810. Thus, service providers 802 may interact with any document processing suite, operating system, and hardware platform that provide access to abstraction layer through which core system capabilities, such as document processing suite API 808 and operating system 810 services, may be accessed. Abstraction layer 806 may provide different interfaces each of which is compatible with the requirements of a different corresponding service provider. With this structure, in various embodiments, plug-in component functionalities described above with respect to FIGS. 3-7B may be used with many different service providers and document processing suites. In various embodiments, the plug-in component is used with a single service provider and a single document processing suite, while in other embodiments, the plug-in component is used with a multiple service provider and multiple document processing suites simultaneously. In the latter embodiments, a particular document may be synchronized and kept consistent on multiple servers from multiple service providers, as well as multiple clients, as further described below with respect to FIG. 8B.

Figure 8B:
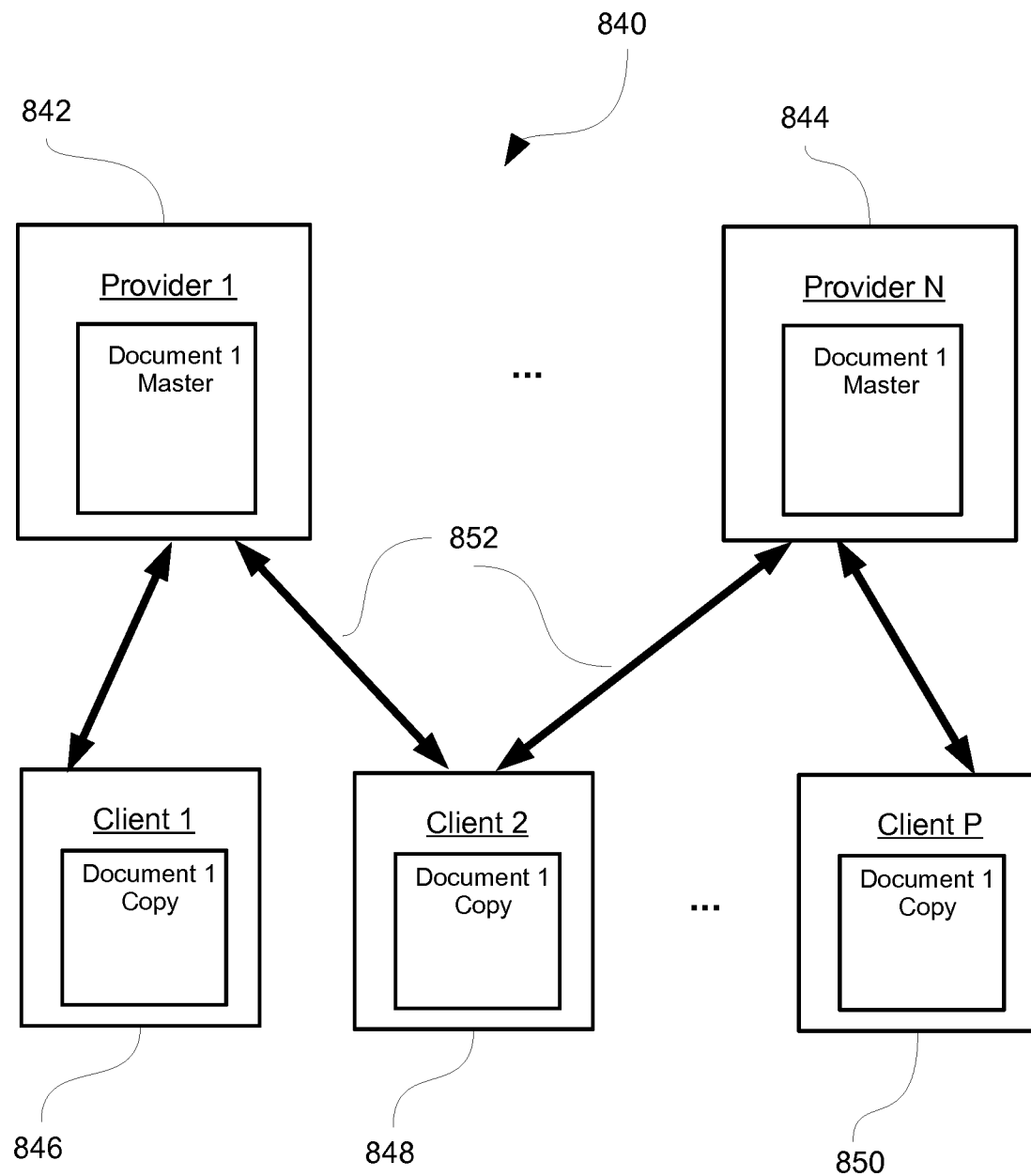
FIG. 8B shows an example interaction between multiple service providers and clients usable for collaboration.

FIG. 8B shows an example interaction between multiple service providers and clients usable for collaboration. In various embodiments, system configuration 840 includes multiple service providers 842 through 844, multiple clients 846, 848, through 850, each coupled with various service providers 842 through 844 via various network connections 852.

Each of the service providers 842 through 844 may have a separate master copy of a particular document, which may be coauthored by two or more of the clients 846, 848, through 850. In this distributed merge configuration, once any one of the client devices modifies the document, the changes to the document automatically and in real time are propagated to all other client and servers by the distributed algorithm, as described above with respect to FIG. 7A. As an illustrative example, client 848 downloads a copy of document 1 master from server of service provider 842 and makes some changes to the document. Next time that client 848 checks the server to determine changes to the document by other clients, client 848 also communicates the changes it made to the document. When other clients check the server for the same purpose, the changes to the document previously made by client 848 now propagates to the other clients. The same process is periodically repeated between all clients and all other service providers in a distributed manner, updating the other master copies of the document on other servers. Thus, all copies of the document, master copies and client copies, are updated with all changes from all collaborating clients in substantially real time and all such copies of the document maintain consistency with other copies.

Figure 9:
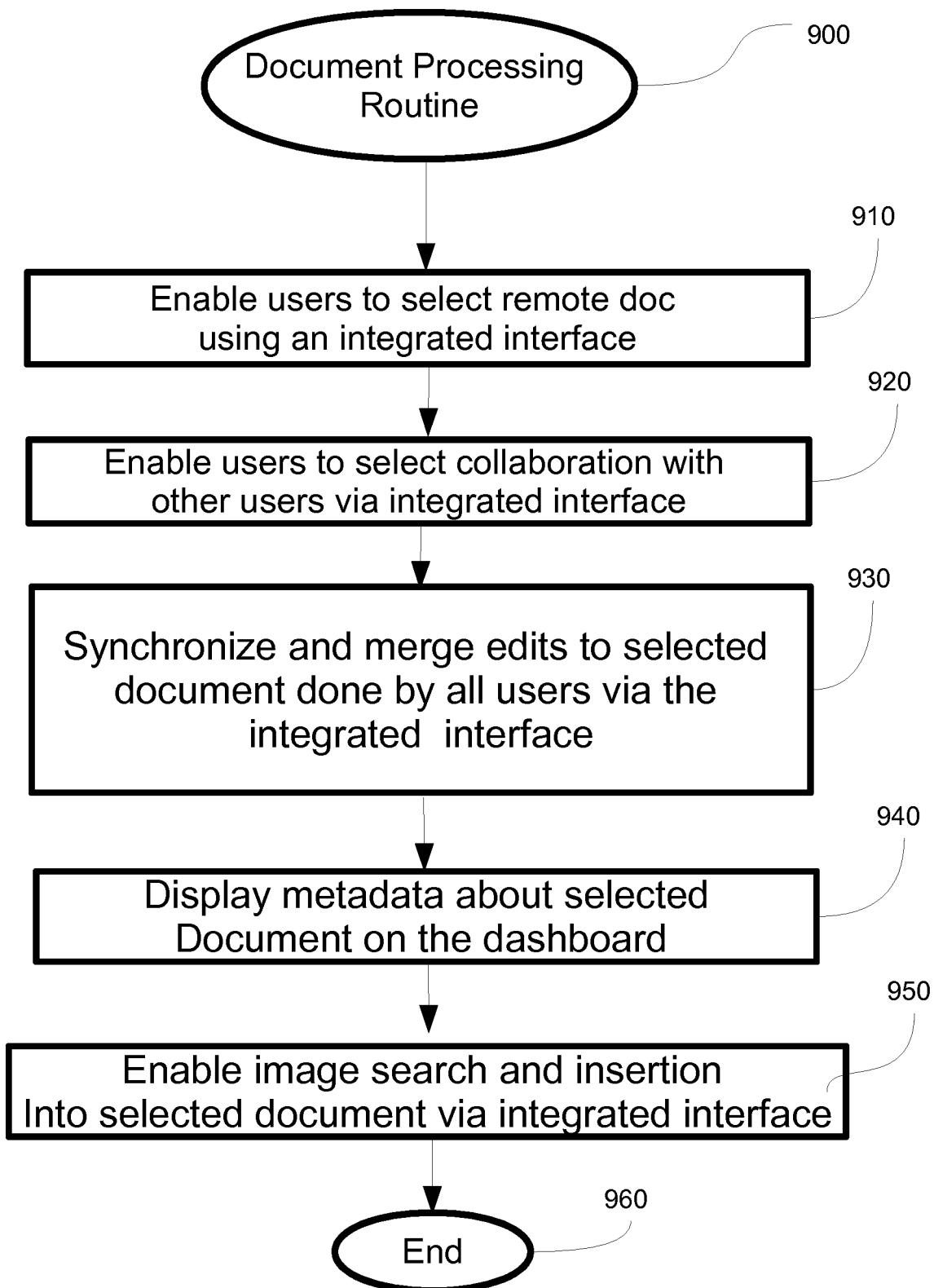
FIG. 9 shows an example flow diagram for document processing.

FIG. 9 shows an example flow diagram for document processing. Routine 900 proceeds to block 910 where a user associated with a client device is enabled to select and load onto the client computing device a particular document using the plug-in component integrated interface described previously with respect to FIGS. 3-7B. The routine proceeds to block 920.

At block 920, the user is enabled to select collaboration with other users/clients, for example, by selecting the Collaboration button in the set of buttons presented by the integrated interface of the plug-in component (for example, see FIG. 3). The routine proceeds to block 930.

At block 930, any changes made to the selected and loaded document is synchronized and merged with other document copies on other collaborating clients, as described in detail above with respect to FIG. 7A. Dashboard section of the plug-in component may be used for real time communications between the collaborating clients. The routine proceeds to block 940.

At block 940, various metadata associated with the selected document and/or the user may be displayed on the dashboard. Such metadata may include information about the document, information about other collaborating authors, presence information showing which clients are currently working on the selected document, information about a project involving the selected document, information about any related files, and the like. The routine proceeds to block 950.

At block 950, interface is provided for the user to perform image search and web search and insert portions of the results into the document, as described earlier with respect to FIGS. 4A and 4B. The routine proceeds to block 960.

At block 960, the routine terminates.

Figure 10:
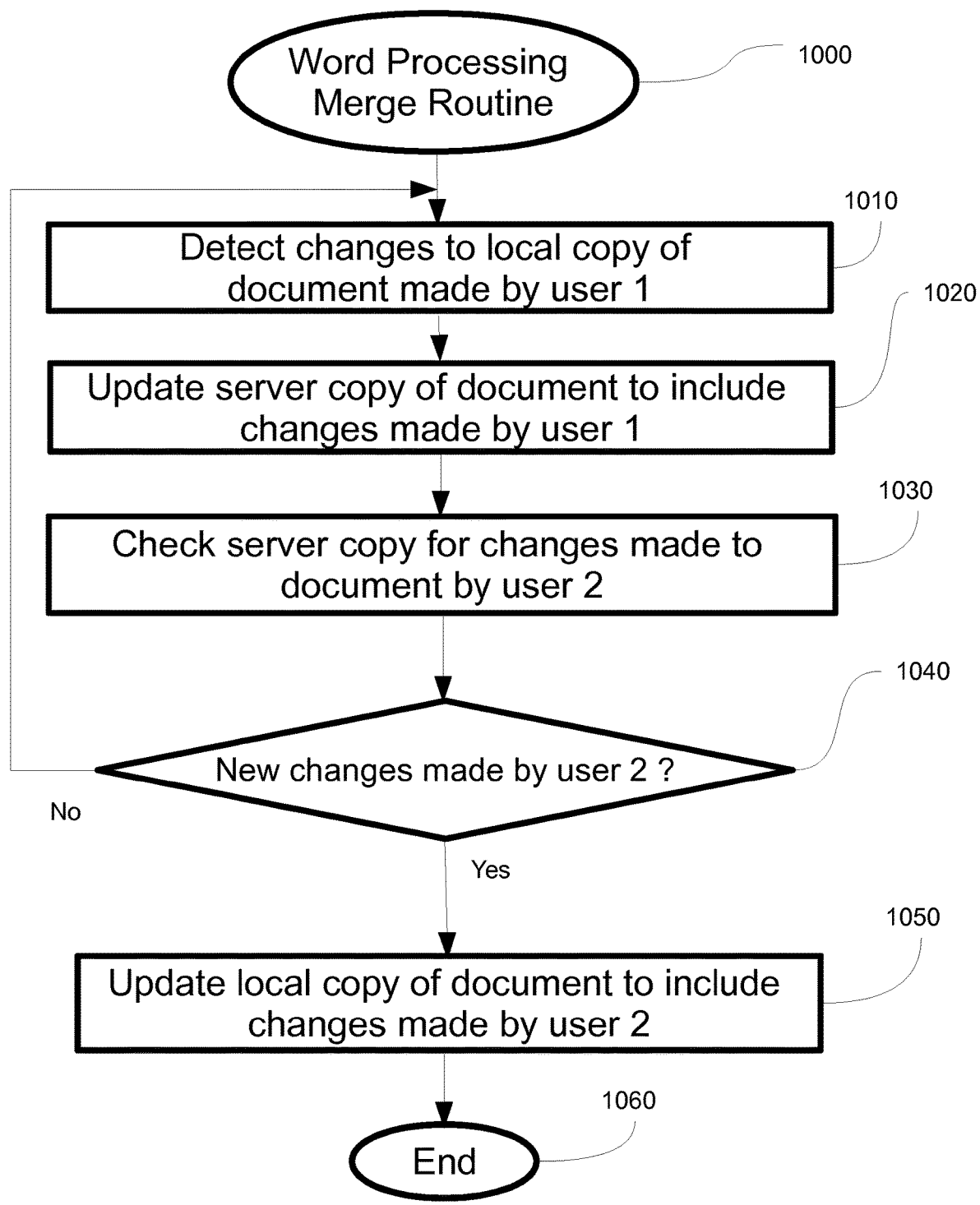
FIG. 10 shows an example flow diagram for a word processing application merge routine.

FIG. 10 shows an example flow diagram for a word processing application merge routine. Routine 1000 proceeds to block 1010 where changes to a local copy of a selected document are made by a first user. With additional reference to FIG. 7A, the local copy of the selected document resides on a client device associated with the first user, which is in communication with a server of a service provider. Multiple client devices and corresponding users may be in communication with the server while collaborating with the first user on the selected document. In various embodiments, the changes made to the local document copy are detected by the plug-in component running on the client device and are periodically communicated to a merge and communication module running on the server, as more fully described above with respect to FIG. 7A. The routine proceeds to block 1020.

At block 1020, a master copy of the selected document on the server is updated with the changes made by the first user and communicated to the server. In various embodiments, the changes to the document may be recorded as differences from the original version of the document, while in other embodiments, the whole document may be replaced by a newer version to effect such changes. The routine proceeds to block 1030.

At block 1030, the client device associated with the first user checks the server to ascertain whether a second user has modified a second copy of the selected document on a client device associated with the second user. Such information about changes made to the document by the second user are communicated to the client device of the first user via the merge and communication module of the server. The routine proceeds to decision block 1040.

At decision block 1040, if new changes are made to the selected document by the second user, the routine proceeds to block 1050. Otherwise, the routine proceeds back to block 1010.

At block 1050, the local copy of the selected document on client device of the first user is updated to include the changes made by the second user. In various embodiments, the changes made by the second users are communicated, by the server, to the first user's client device and then merged with the first user's document on the client device of the first user, while in other embodiments, the actual document merge takes place on the server and then communicated to the first user's client device. The routine proceeds to block 1060.

At block 1060, the routine terminates.

Figure 11:
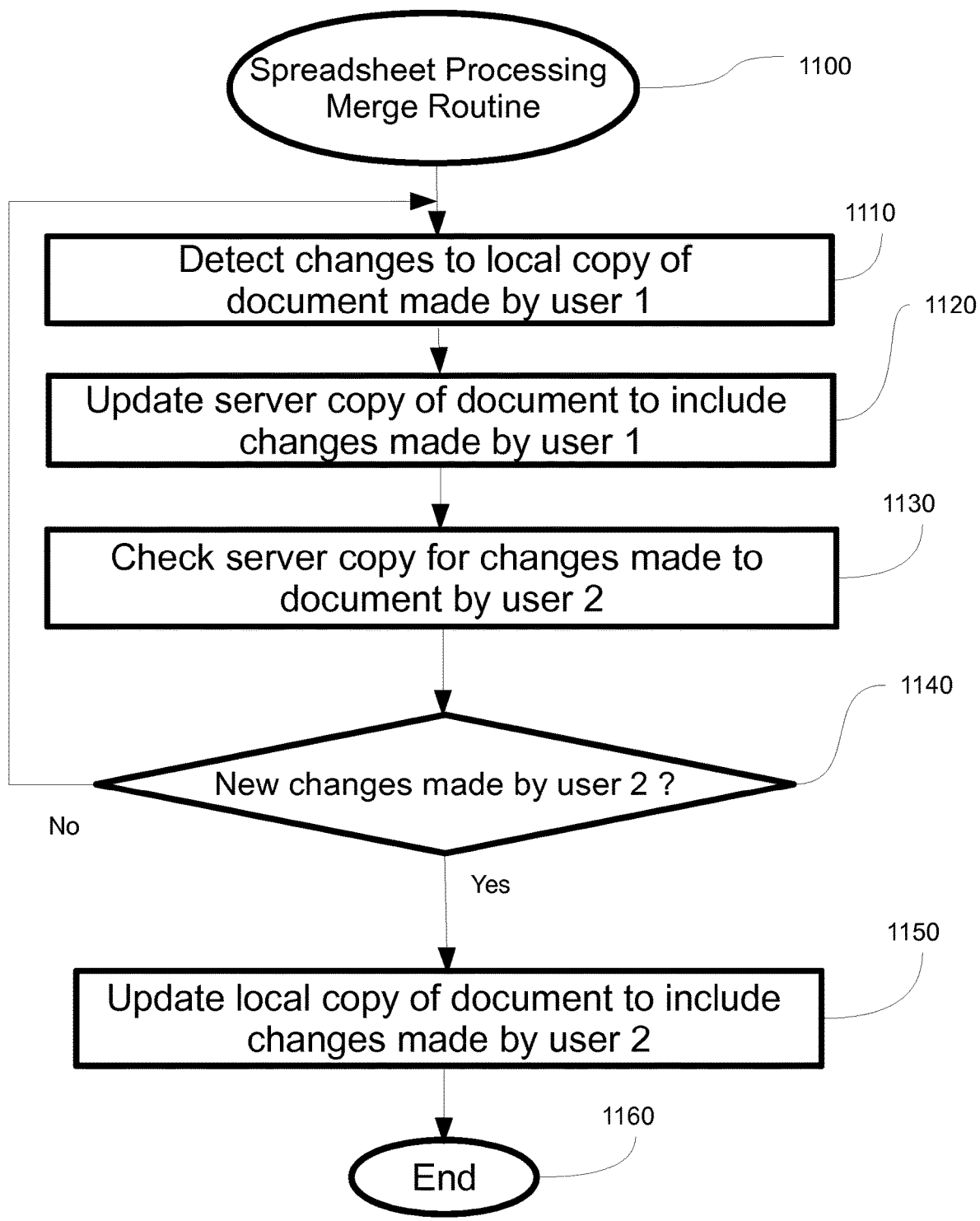
FIG. 11 shows an example flow diagram for a spreadsheet application merge routine.

FIG. 11 shows an example flow diagram for a spreadsheet application merge routine. Routine 1100 is substantially similar to routine 1000 described above with respect to FIG. 10. The routine proceeds to block 1110 where changes to a local copy of a selected spreadsheet document are made by a first user. With additional reference to FIG. 7A, the local copy of the selected document resides on a client device associated with the first user, which is in communication with a server of a service provider. Multiple client devices and corresponding users may be in communication with the server while collaborating with the first user on the selected document. In various embodiments, the changes made to the local document copy are detected by the plug-in component running on the client device and are periodically communicated to a merge and communication module running on the server, as more fully described above with respect to FIG. 7A. The routine proceeds to block 1120.

At block 1120, a master copy of the selected document on the server is updated with the changes made by the first user and communicated to the server. In various embodiments, the changes to the document may be recorded as differences from the original version of the document, while in other embodiments, the whole document may be replaced by a newer version to effect such changes. The routine proceeds to block 1130.

At block 1130, the client device associated with the first user checks the server to ascertain whether a second user has modified a second copy of the selected document on a client device associated with the second user. Such information about changes made to the document by the second user are communicated to the client device of the first user via the merge and communication module of the server. The routine proceeds to decision block 1140.

At decision block 1140, if new changes are made to the selected document by the second user, the routine proceeds to block 1150. Otherwise, the routine proceeds back to block 1110.

At block 1150, the local copy of the selected document on client device of the first user is updated to include the changes made by the second user. In various embodiments, the changes made by the second users are communicated, by the server, to the first user's client device and then merged with the first user's document on the client device of the first user, while in other embodiments, the actual document merge takes place on the server and then communicated to the first user's client device. The routine proceeds to block 1160.

At block 1160, the routine terminates.

Figure 12:
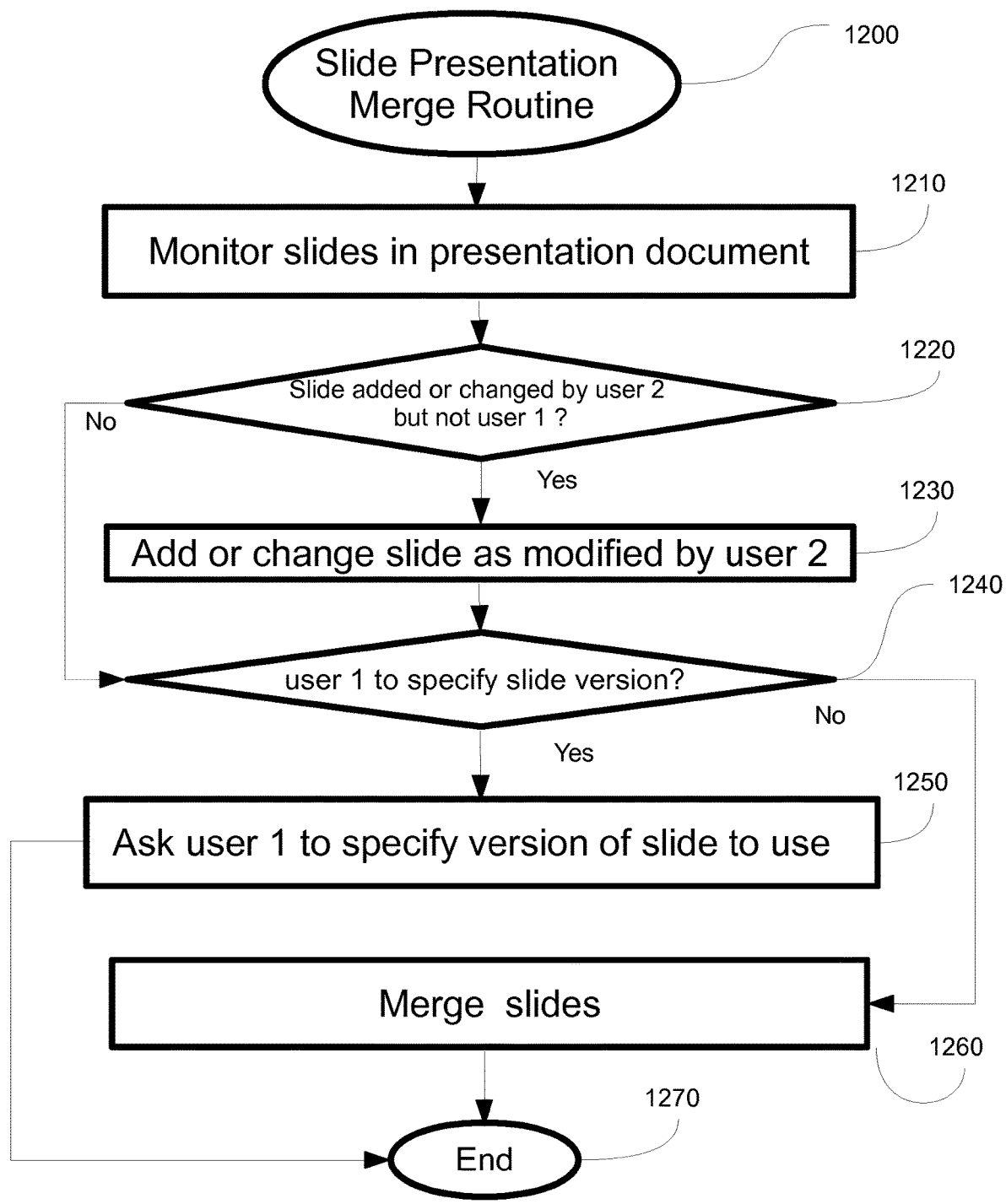
FIG. 12 shows an example flow diagram for a slide presentation application merge routine.

FIG. 12 shows an example flow diagram for a slide presentation application merge routine. With additional reference to FIG. 7B, routine 1200 proceeds to block 1210 where slides in a slide presentation document are monitored for changes. Each of a first and a second client device, associated with a first and a second user, respectively, has a local copy of the slide presentation document and is in communication with a server operated by a service provider. The server has a master copy of the slide presentation document. All copies of the slide presentation document on the client devices and the server are updated periodically to stay consistent with each other as further described below. The routine proceeds to decision block 1220.

At decision block 1220, it is ascertained whether a new slide was added or changes were made to an existing slide by only the second user and not the first user. If so, the routine proceeds to block 1230. Otherwise, the routine proceeds to decision block 1240.

At block 1230, the slide added or changed by the second user is added or replaces the corresponding slide in the first user's copy of the document. Such merge and/or update of the slide is performed in communication with the server as described above at least with respect to FIG. 7B.

At decision block 1240, the first user has also modified the slide. At this block, it is ascertained whether the first should be queried to specify which copy of the slide to use, the copy modified by the first user or the copy modified by the second user. If the first user is to specify the version of the slide to be used in the copy of the document associated with the first user, then the routine proceeds to block 1250, otherwise, the routine proceeds to block 1260.

At block 1250, the first user is queried as to which copy/version of the modified slide is placed in the slide presentation document copy associated with the first user, the version as modified by the first user or the version modified by the second user. Accordingly, the appropriate version is placed in the copy of slide presentation document of the first user. The routine proceeds to block 1270.

At block 1260, both the first and the second user have modified the same slide, but the first user does not have the option to select which slide version is to be used. In this case, the slides are merged automatically to resolve content differences as described above with respect to FIG. 7B. Specifically, in embodiments with inter-slide granularity, users may be assigned different priorities and the version of the slide modified by the user with the highest priority replaces all other users' versions. In embodiments with intra-slide granularity, the contents of the different slides are merged in the text and the graphical portions of the slide as described above with respect to FIG. 7B. The routine proceeds to block 1270.

At block 1270, the routine terminates.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the disclosure.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems which perform the specified actions or steps, or combinations of special purpose hardware and computer instructions.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A method comprising:
performing by one or more processors executing code in a first client computer system:
  installing a plug-in software component after completing installation of a document processing suite, wherein the plug-in software component provides a capability that does not exist in the document processing suite;
  accessing a document being edited using the document processing suite;
  accessing the plug-in software component installed on the first client computer system that runs within the document processing suite, wherein the plug-in software component includes at least one interface to submit queries through to a second client computer system to receive and access metadata associated with the document from the second client computer system, wherein the first and second client computer systems are clients of a remote service provider system;
  dynamically searching for and discovering metadata responsive to the queries and related to the document being edited using the document processing suite by accessing the installed plug-in software and, via the installed plug-in software component and the interface, querying data stores, on at least the second client computer system, wherein the query automatically discovers metadata related to the document, the metadata having related information about the particular document;
  executing the plug-in software component on the first client computer system to cause the first client computing device to (i) present integrated user interfaces within the document processing suite to communicate with the remote service provider system and the second client computer system and (ii) actively monitor for changes in previously discovered metadata by querying the data stores on at least second client computer system; and
  displaying the discovered and monitored metadata in a dashboard area of the first computer system.

2. The method of claim 1, further comprising communicating the discovered metadata to at least one remote client computing device.

3. The method of claim 1, further comprising dynamically discovering additional metadata using an autonomous software agent.

4. The method of claim 1, wherein the metadata is dynamically discovered by multiple plug-in components integrated with the document processing suite.

5. The method of claim 1, wherein the metadata includes information about the location of an original copy of the particular document on a collaboration server.

6. The method of claim 1, wherein the particular document is associated with a plurality of master copies of the same document stored on servers of unrelated service providers.

7. The method of claim 6, further comprising merging the plurality of master copies to create a single version of the master copy stored on all of the servers.

8. The method of claim 7, wherein the merging of the plurality of master copies is under distributed control comprising participation of multiple service providers and multiple client computing devices.

9. A method of co-authoring a document and discovering metadata and monitoring for changes in the discovered metadata, the method comprising:
performing by one or more processors executing code in a first client computer system:
  installing a plug-in software component after completing installation of a document processing suite, wherein the plug-in software component provides a capability that does not exist in the document processing suite;
  accessing a document being edited using the document processing suite;
  accessing the plug-in software component installed on the first client computer system that is integrated with the document processing suite, wherein the plug-in software component includes at least one interface to submit queries through to a second client computer system to receive and access metadata associated with the document from the second client computer system, wherein the first and second client computer systems are clients of a remote service provider system not associated with the document processing suite;
  executing the plug-in software component on the first client computer system to cause the first client computing device to present an integrated user interfaces within the document processing suite to communicate with the remote service provider system and the second client computer system;
  dynamically searching for and discovering metadata responsive to the queries and related to the document being edited using the document processing suite by accessing the installed plug-in software and, via the installed plug-in software component and the interface, querying data stores, on at least one the second client computer system, wherein the query automatically discovers metadata related to the document, the metadata having related information about the particular document;
  executing the plug-in software component to actively monitor for changes in previously discovered metadata by querying the data stores on at least second client computer system;
  using a dashboard area configured to display metadata related to a local document being edited on the first client computer system using document processing suite, the metadata related to the local document including additional related subject information, related project information, and related author information about an author of the particular document, wherein the first client computer system is in communication with the server computing device having a master document copy of the local document stored thereon and with the second client computer system;
  entering user comments on the first client computer system;
  transmitting the user comments to the server computing device; and
  transmitting the user comments from the server computing device to the second client computer system used to edit another local document copy of the master document.

10. The method of claim 9, further comprising using a dashboard button to activate the dashboard area.

11. The method of claim 9, further comprising identifying comments of a particular user using a particular color.

12. The method of claim 9, further comprising dynamically discovering additional metadata using an autonomous software agent.

13. The method of claim 12, wherein the metadata is obtained from a plurality of remote sources unassociated with the server computing device and the first and the second client computer systems.

14. The method of claim 9, wherein the user comments are transmitted to the server computing device by multiple plug-in components integrated with the document processing suite.

* * * * *